(12) United States Patent
Park et al.

(10) Patent No.: US 12,074,666 B2
(45) Date of Patent: Aug. 27, 2024

(54) METHOD FOR REPORTING CHANNEL STATE INFORMATION IN WIRELESS COMMUNICATION SYSTEM, AND DEVICE THEREFOR

(71) Applicants: LG ELECTRONICS INC., Seoul (KR); SOGANG UNIVERSITY RESEARCH FOUNDATION, Seoul (KR)

(72) Inventors: Haewook Park, Seoul (KR); Wonjae Ryoo, Seoul (KR); Wonjin Sung, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 394 days.

(21) Appl. No.: 17/629,331

(22) PCT Filed: Jul. 23, 2020

(86) PCT No.: PCT/KR2020/009711
§ 371 (c)(1),
(2) Date: Jan. 21, 2022

(87) PCT Pub. No.: WO2021/015569
PCT Pub. Date: Jan. 28, 2021

(65) Prior Publication Data
US 2022/0329295 A1  Oct. 13, 2022

(30) Foreign Application Priority Data

Jul. 23, 2019  (KR) .................. 10-2019-0089183

(51) Int. Cl.
*H04B 7/0456* (2017.01)
*H04B 7/06* (2006.01)
(Continued)

(52) U.S. Cl.
CPC ......... *H04B 7/0456* (2013.01); *H04L 5/0048* (2013.01); *H04W 24/08* (2013.01)

(58) Field of Classification Search
CPC .. H04B 7/0456; H04B 7/0617; H04B 7/0639; H04B 7/0695; H04B 7/088;
(Continued)

(56) References Cited

U.S. PATENT DOCUMENTS

2015/0207547 A1  7/2015  Ko et al.
2019/0044589 A1  2/2019  Park et al.
(Continued)

FOREIGN PATENT DOCUMENTS

WO    2018228707    12/2018

OTHER PUBLICATIONS

PCT International Application No. PCT/KR2020/009711, International Search Report dated Oct. 26, 2020, 2 pages.
(Continued)

*Primary Examiner* — Harry H Kim
(74) *Attorney, Agent, or Firm* — LEE, HONG, DEGERMAN, KANG & WAIMEY

(57) ABSTRACT

Disclosed are a method for reporting channel state information (CSI) in a wireless communication system, and a device therefor. Specifically, a method for reporting CSI by a user equipment (UE) in a wireless communication system comprises the step of: receiving a CSI-related reference signal; measuring CSI on the basis of the reference signal and a codebook; and reporting the CSI, wherein reception and transmission operations of the UE are performed on the basis of a three-dimensionally shaped antenna array formed by arranging a plurality of antenna elements in a three-dimensional configuration, the antenna array comprises a plurality of antenna elements, and the codebook is generated on the basis of the path difference between the distance from (Continued)

the origin, which is the center of the three-dimensional shape, to the UE and the distance from a specific antenna element to the UE.

19 Claims, 23 Drawing Sheets

(51) Int. Cl.
  *H04B 17/318* (2015.01)
  *H04L 5/00* (2006.01)
  *H04W 24/08* (2009.01)
(58) Field of Classification Search
  CPC ... H04B 7/0469; H04B 17/318; H04L 5/0048; H04L 5/0023; H04L 5/005; H04L 5/0057; H04W 24/08; Y02D 30/70
  See application file for complete search history.

(56) References Cited

U.S. PATENT DOCUMENTS

| | | |
|---|---|---|
| 2019/0068259 A1 | 2/2019 | Liu et al. |
| 2020/0177252 A1* | 6/2020 | Park .................. H04L 27/18 |
| 2020/0204002 A1* | 6/2020 | Hajimiri ............. H02J 50/402 |
| 2022/0069879 A1* | 3/2022 | Wernersson ......... H04B 7/0658 |

OTHER PUBLICATIONS

Arshad et al., "A Novel Multi-User Codebook Design for 5G in 3D-MIMO Heterogeneous Networks," Electronics, vol. 7, Issue 8, Aug. 2018, 5 pages.

* cited by examiner

【FIG. 1】
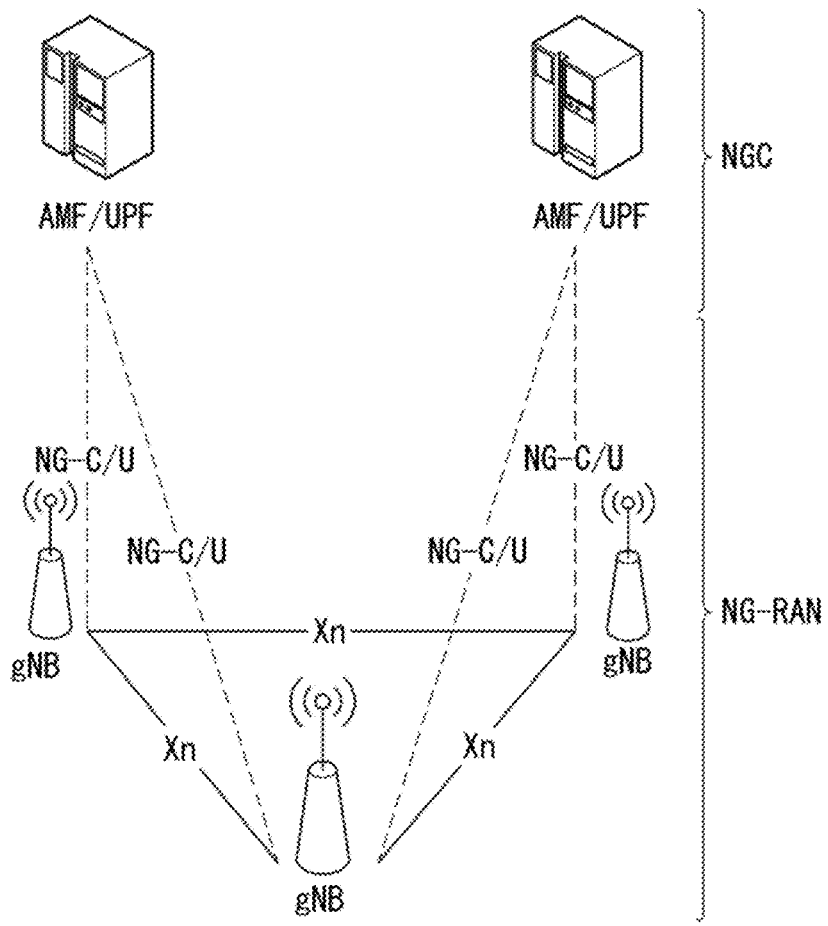
【FIG. 2】
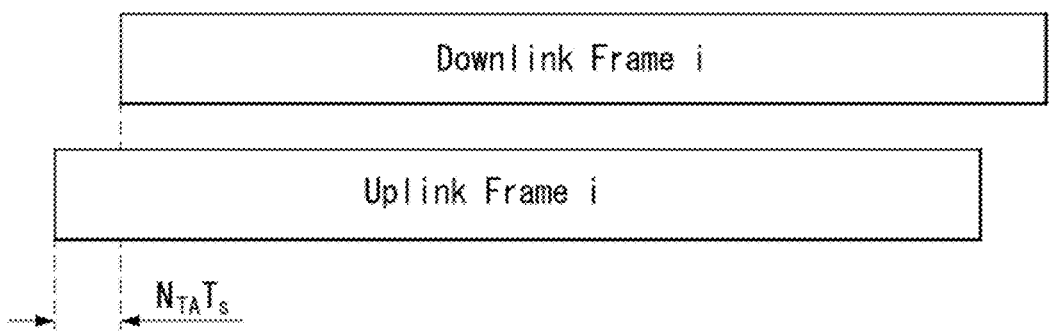

[FIG. 3]
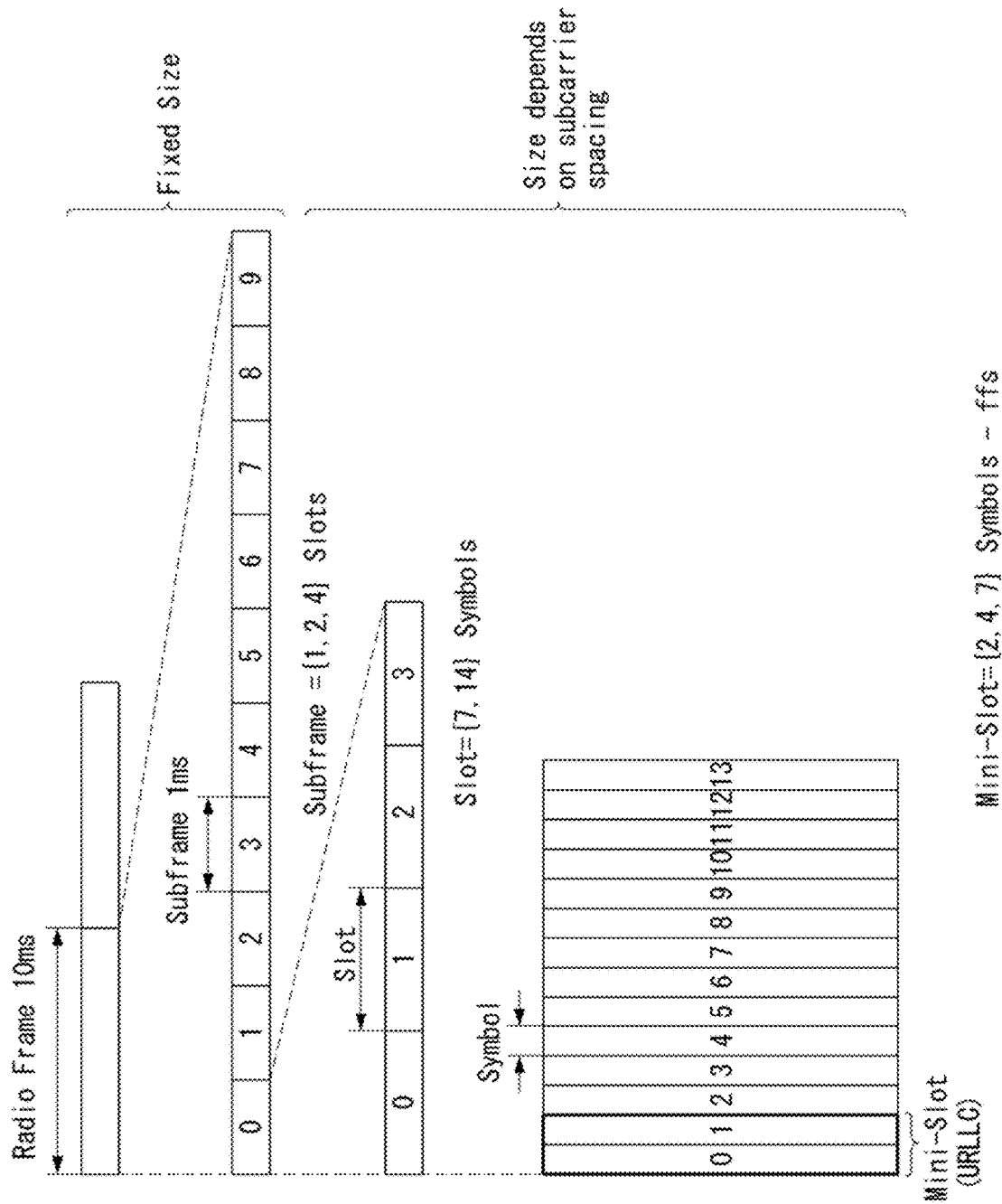

[FIG. 4]
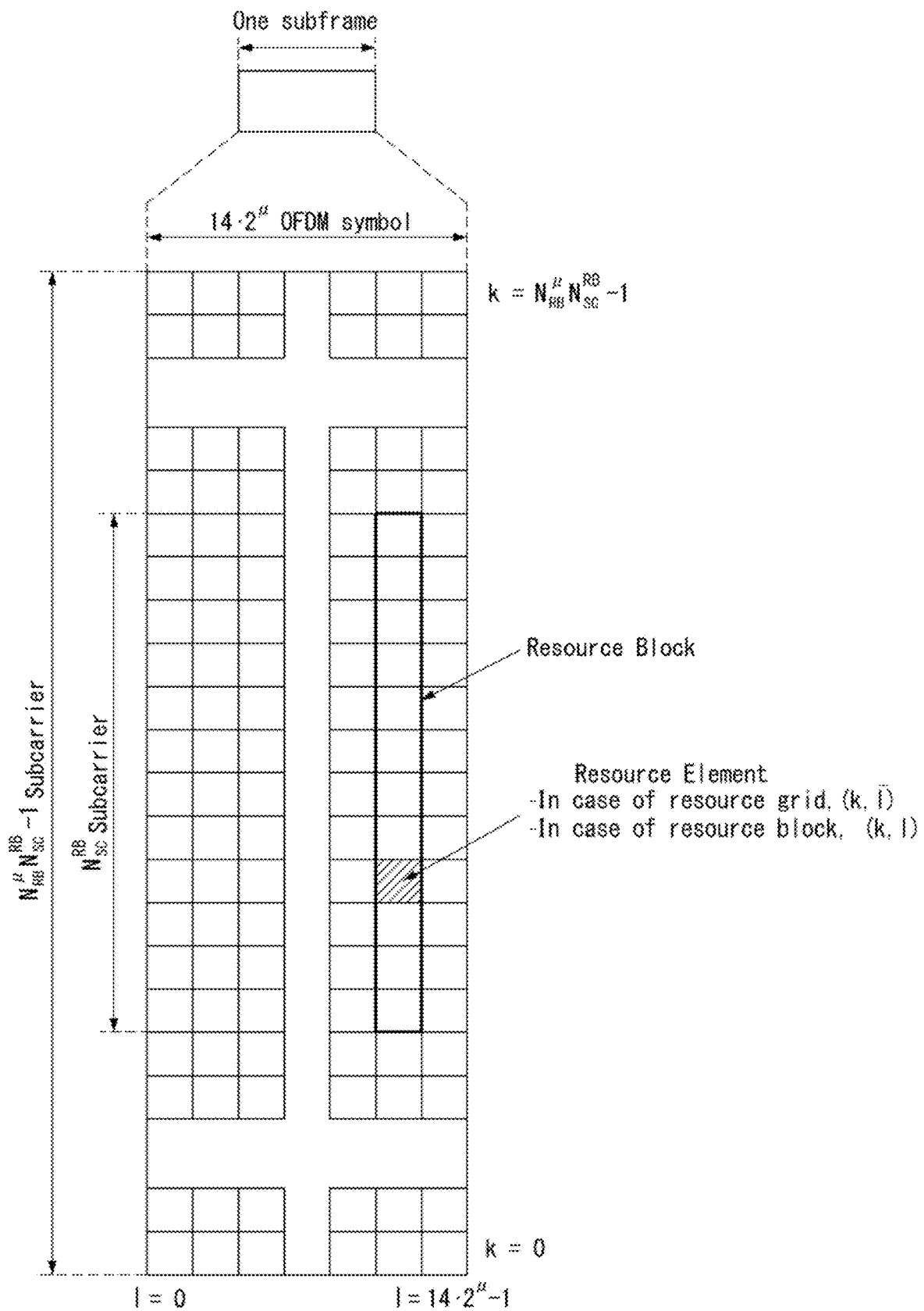

[FIG. 5]
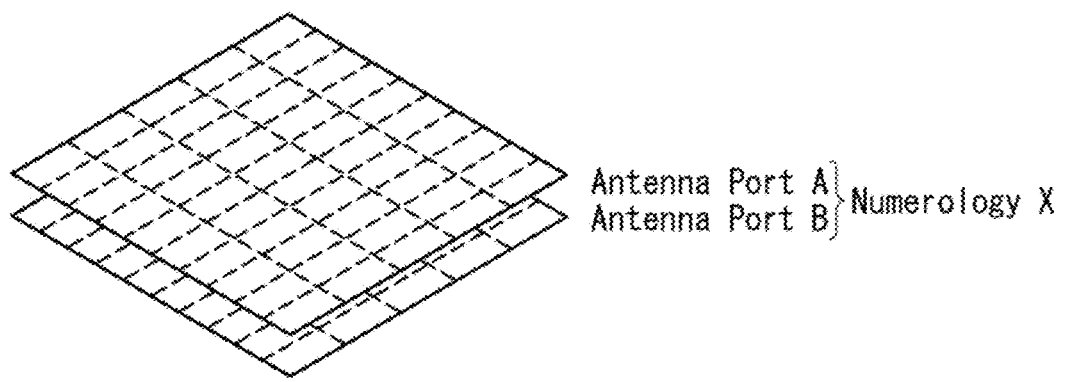
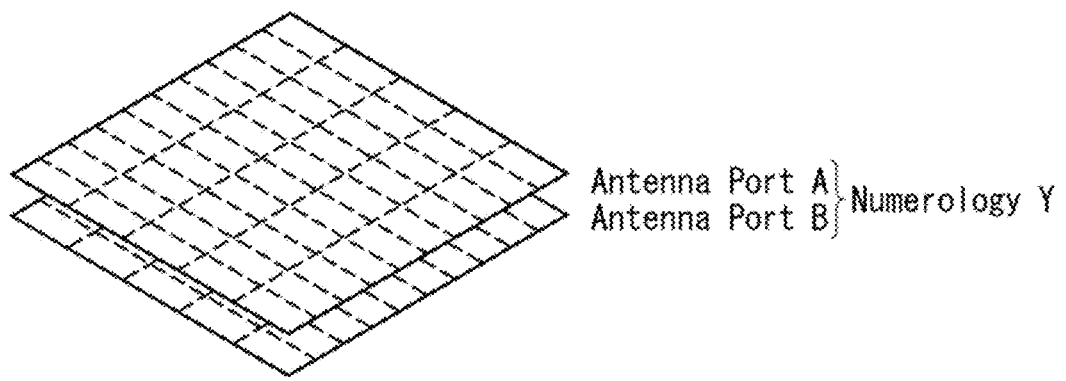

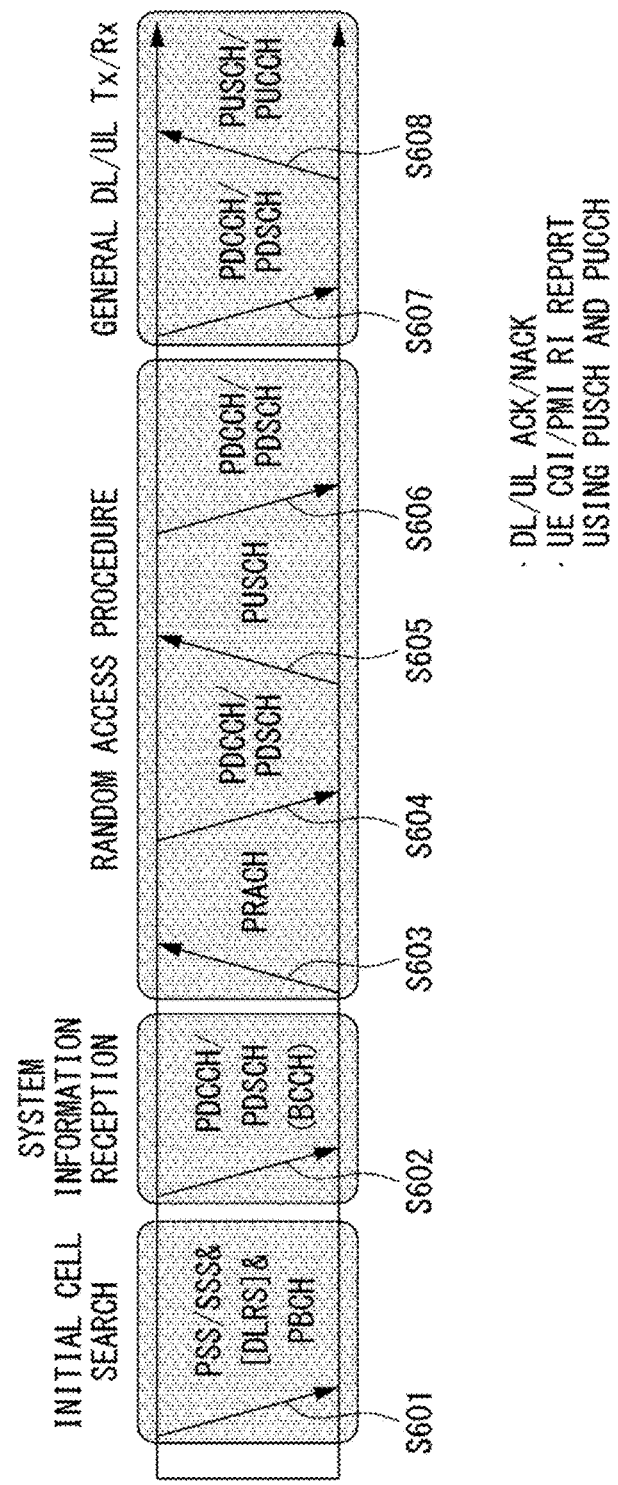
[FIG. 6]

[FIG. 7]
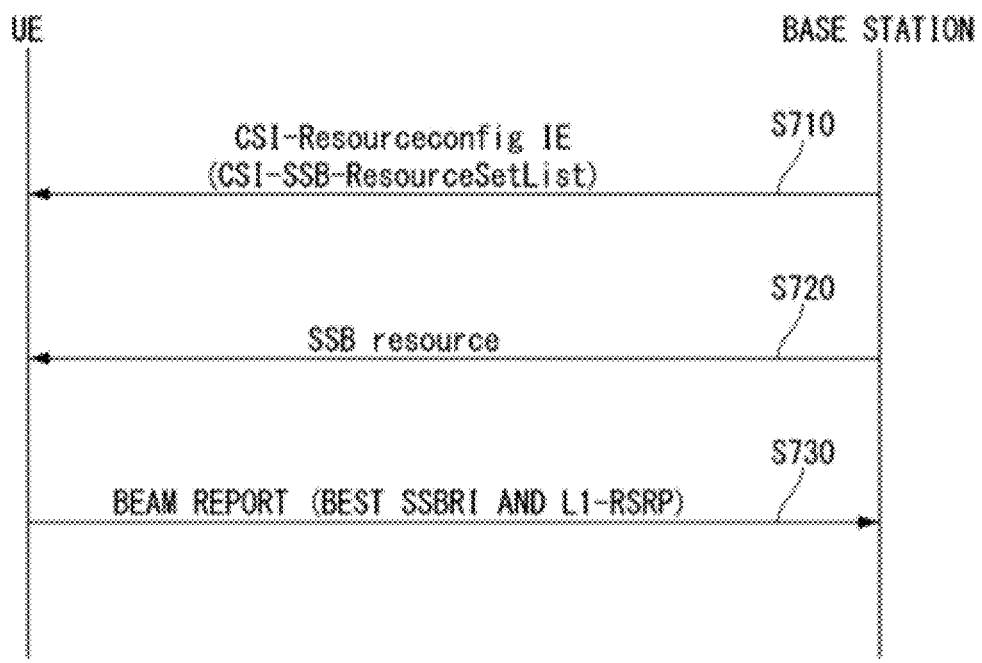

[FIG. 8]
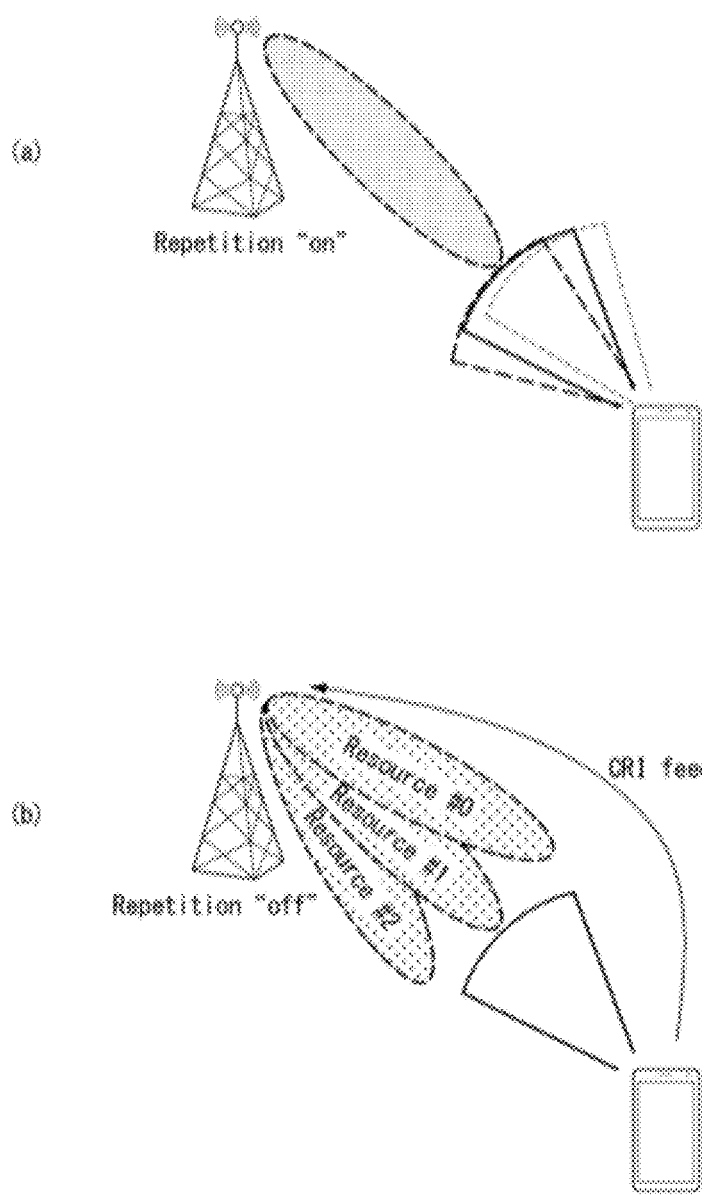

【FIG. 9】
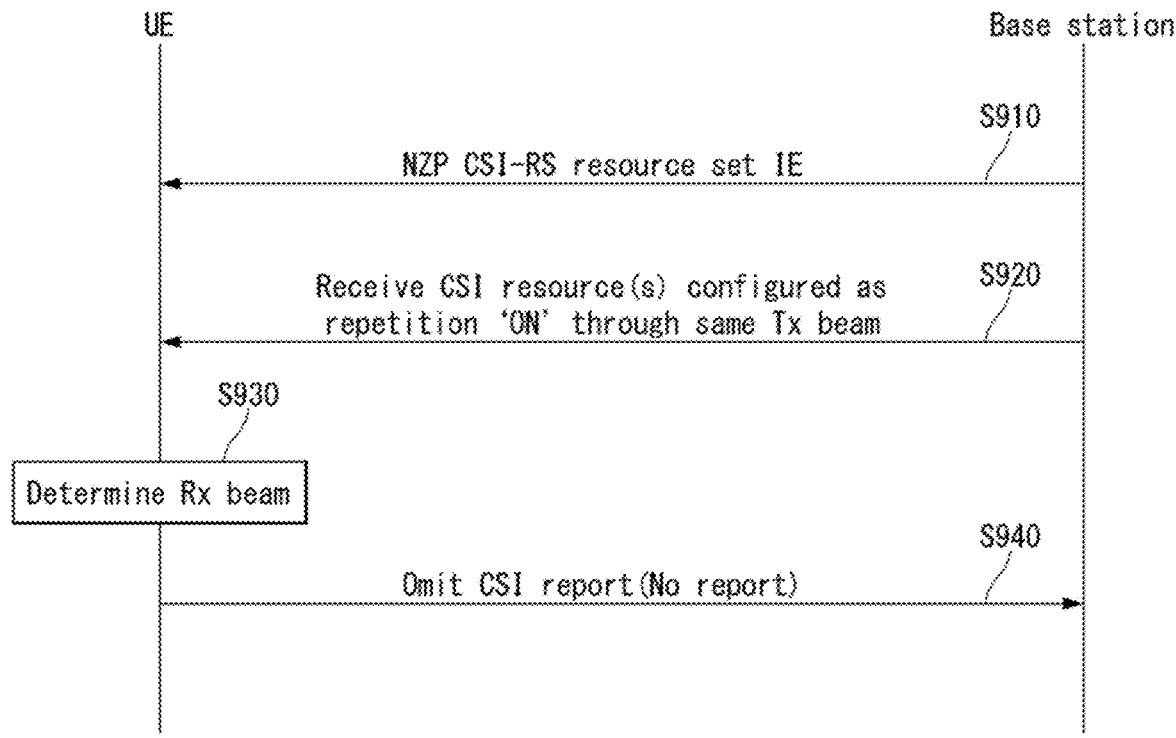
【FIG. 10】
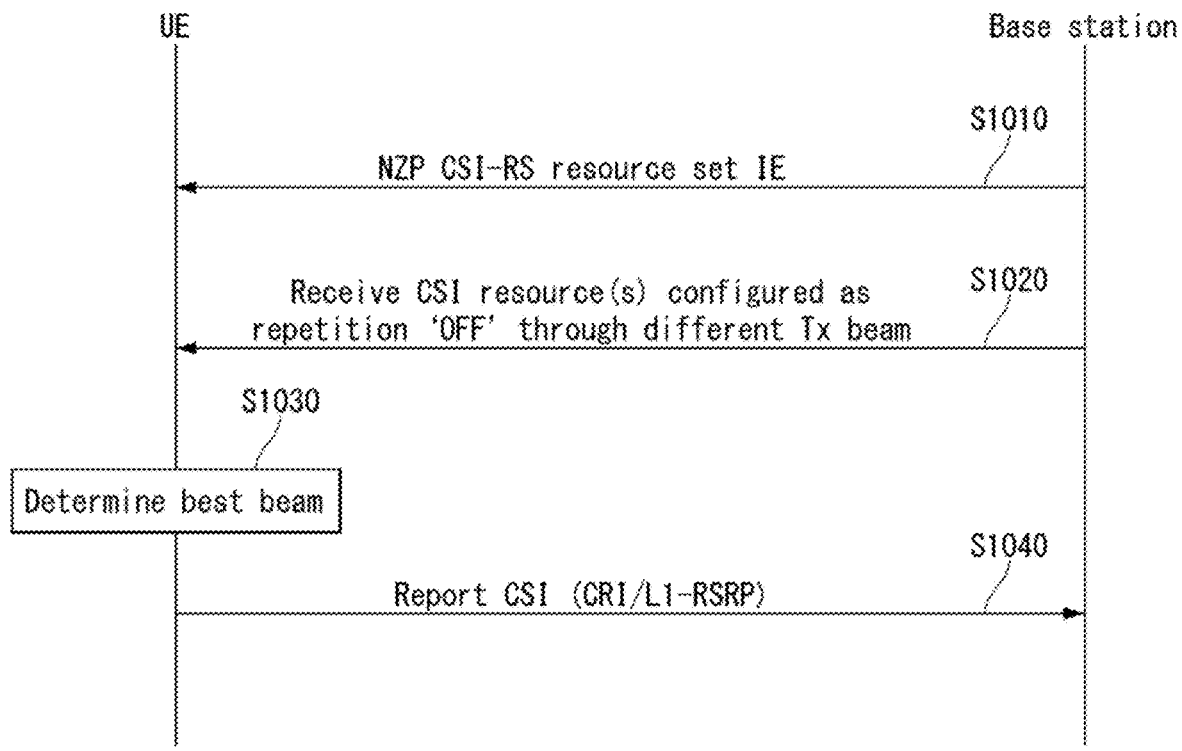

[FIG. 11]
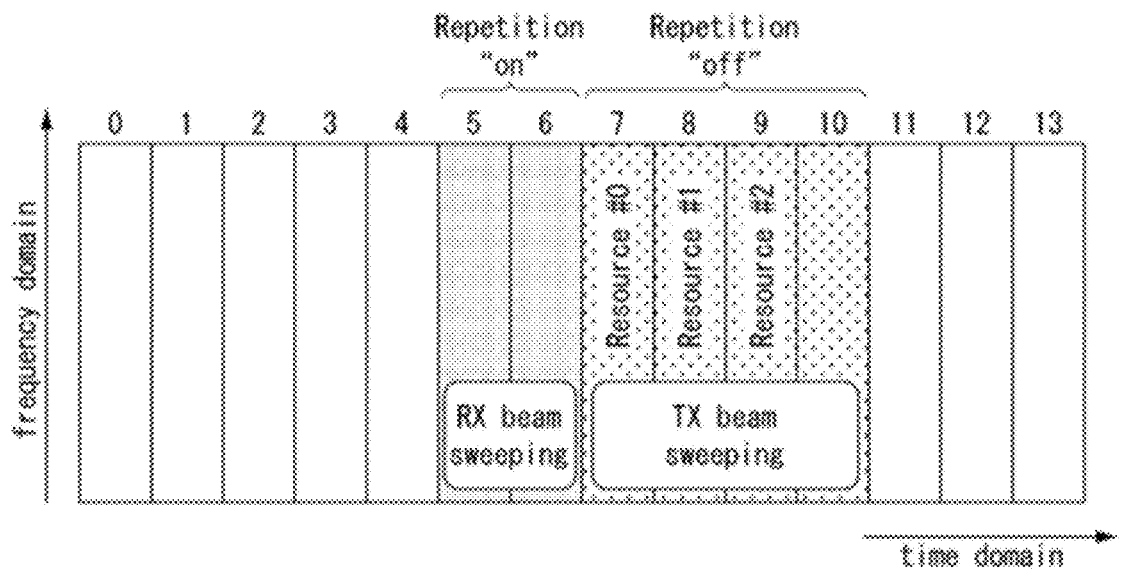
[FIG. 12]
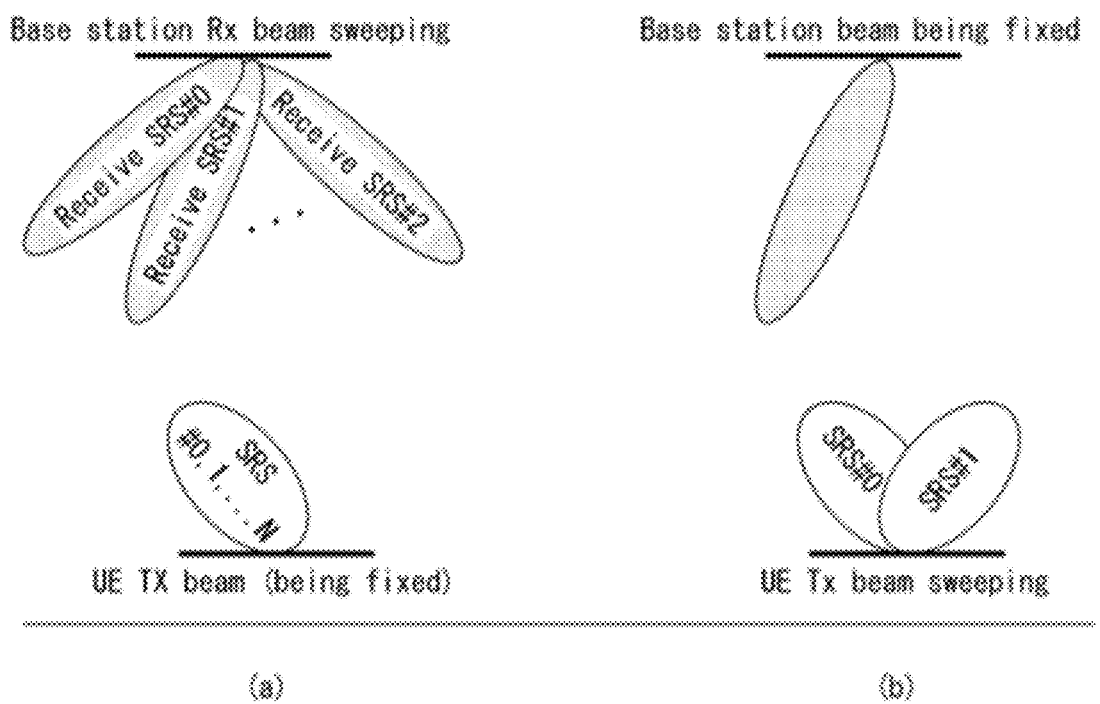

[FIG. 13]
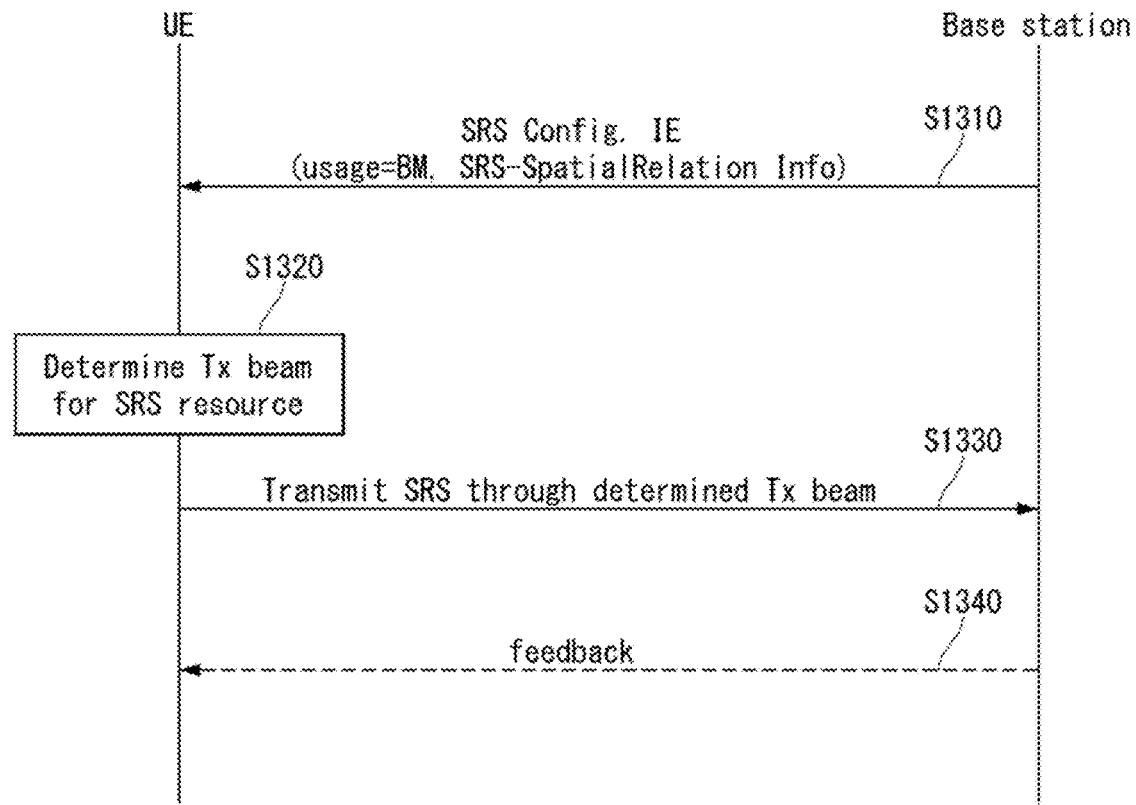
[FIG. 14]
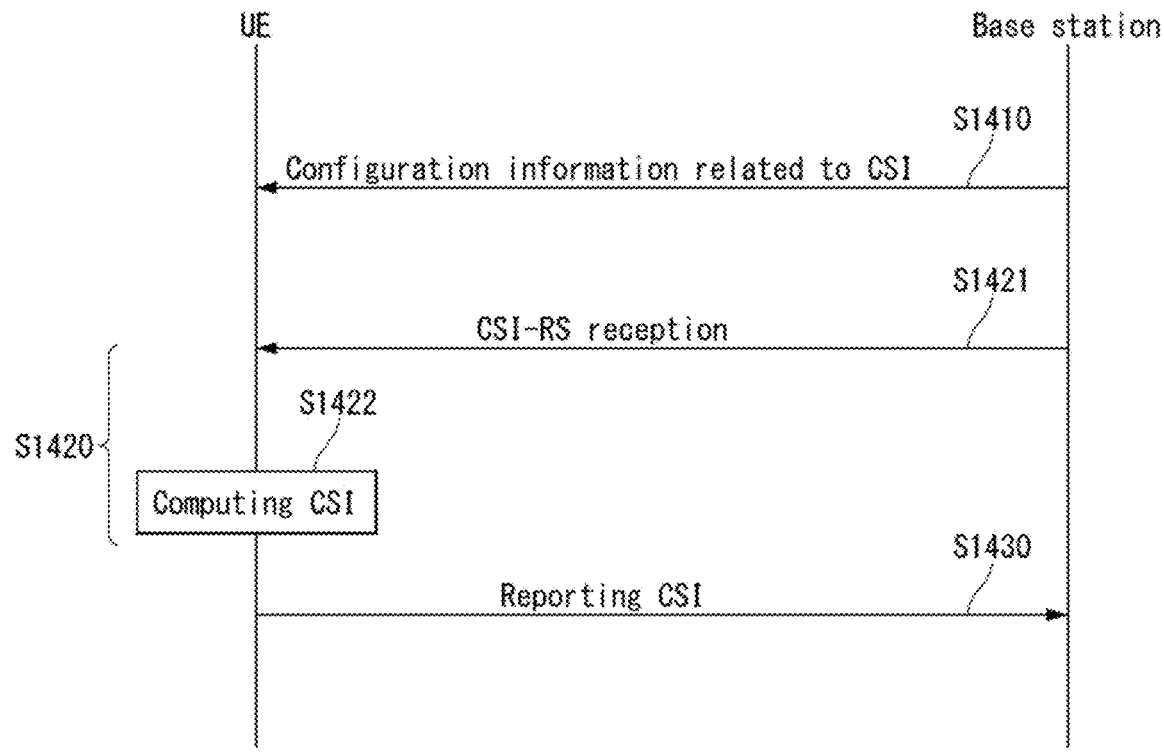

[FIG. 15]
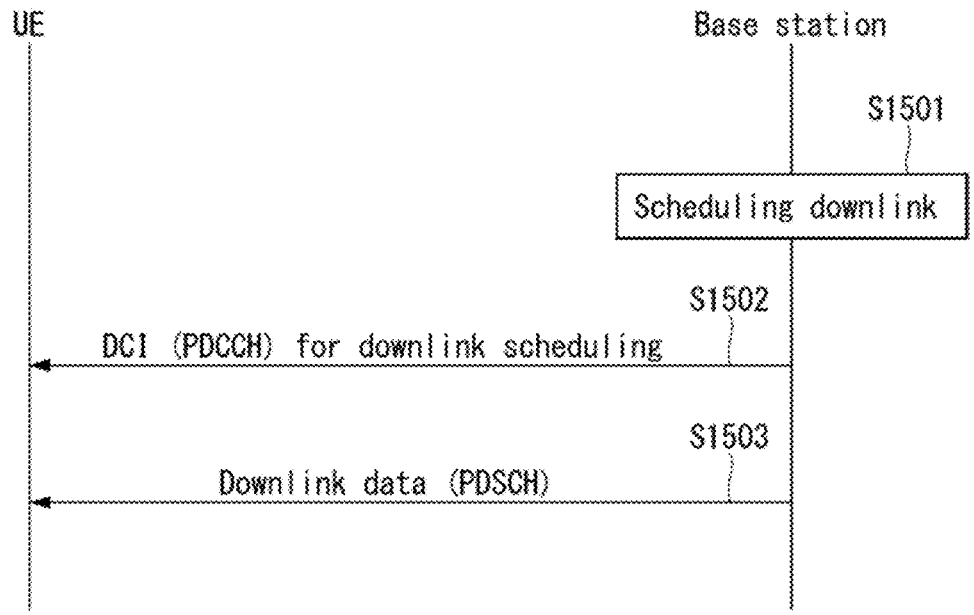
[FIG. 16]
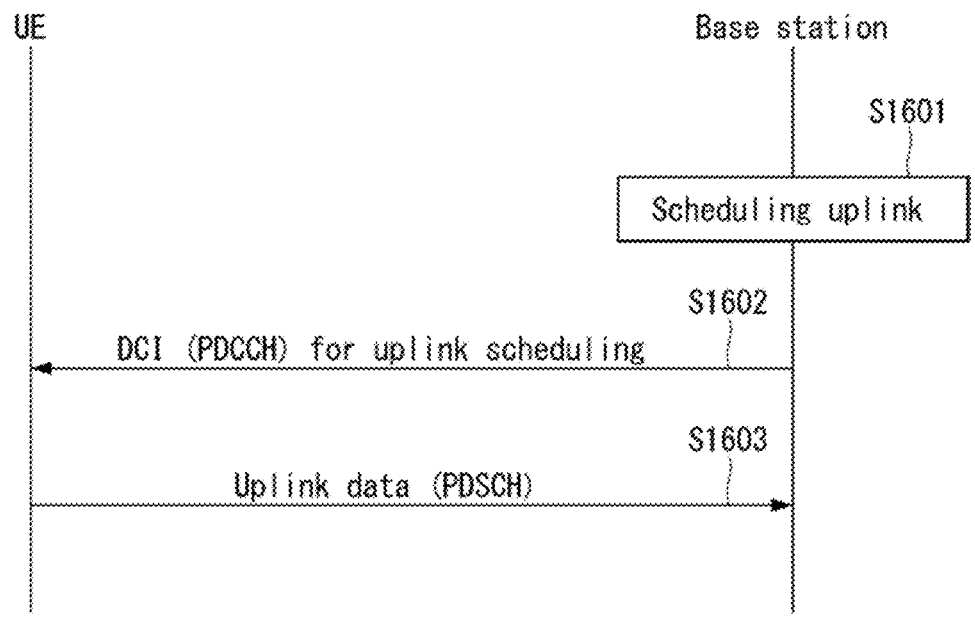

[FIG. 17]
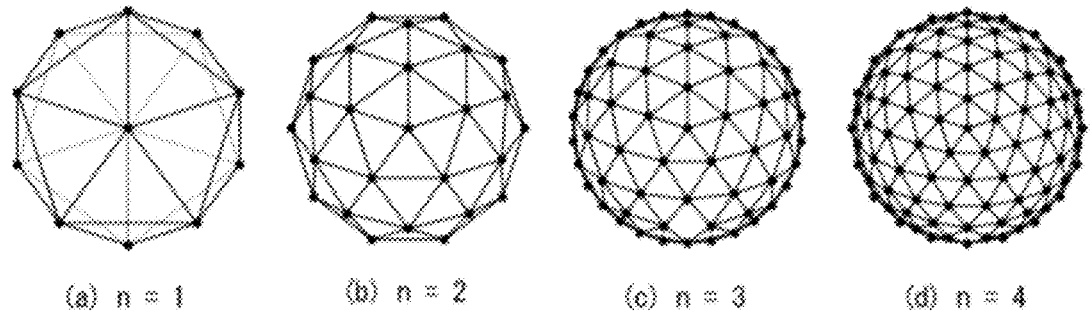
(a) n = 1  (b) n = 2  (c) n = 3  (d) n = 4
[FIG. 18]
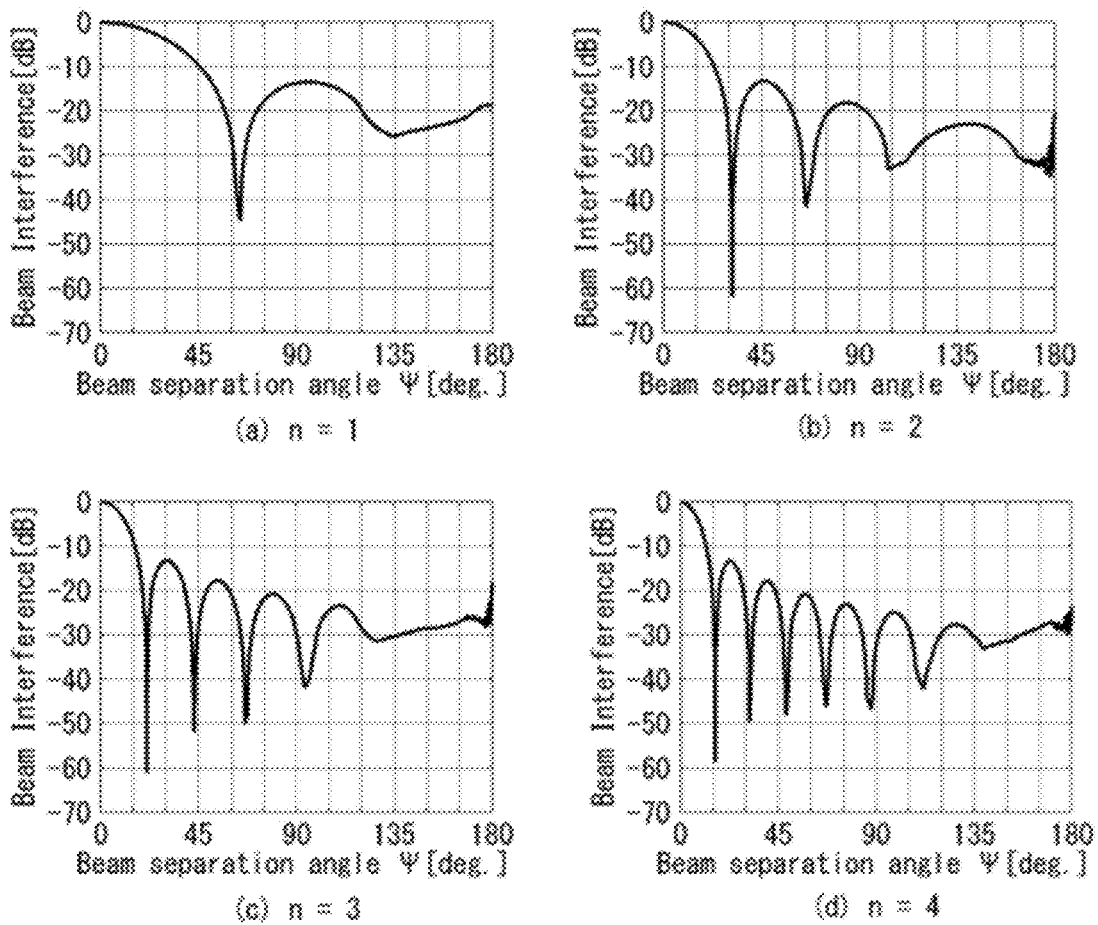

[FIG. 19]
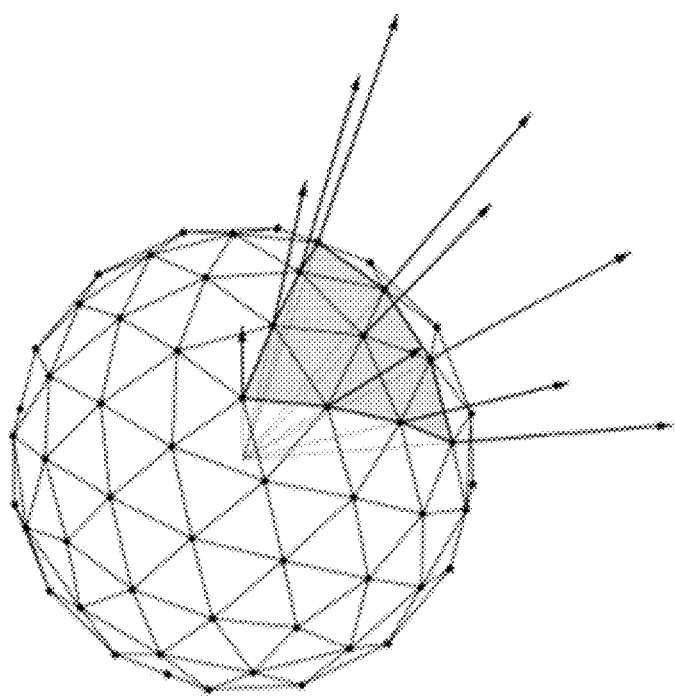

[FIG. 20]
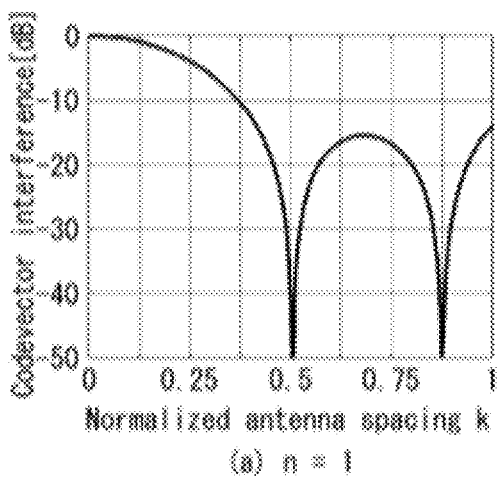
(a) n = 1
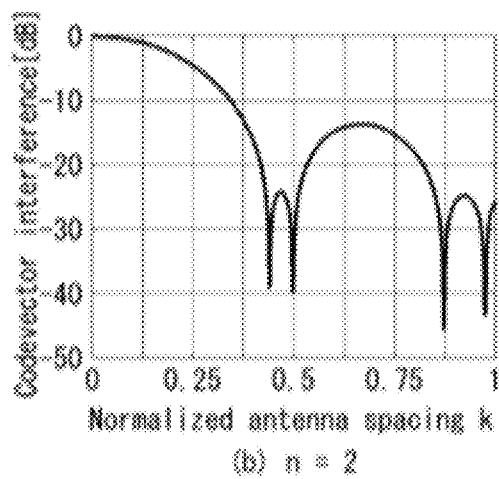
(b) n = 2
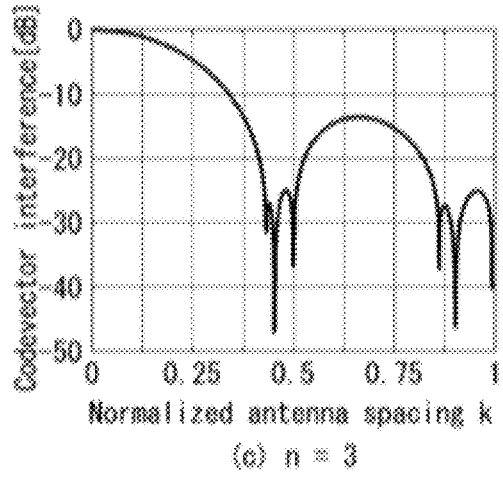
(c) n = 3
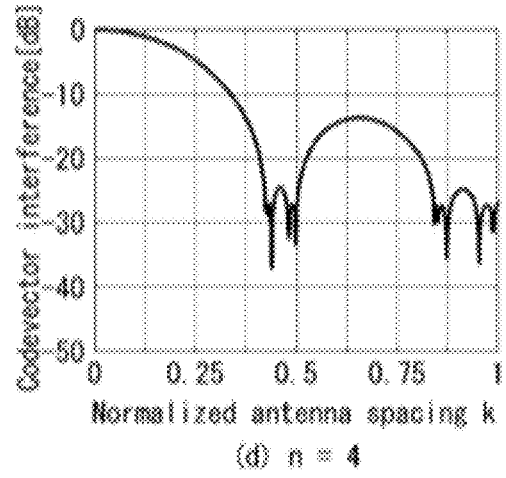
(d) n = 4

【FIG. 21】
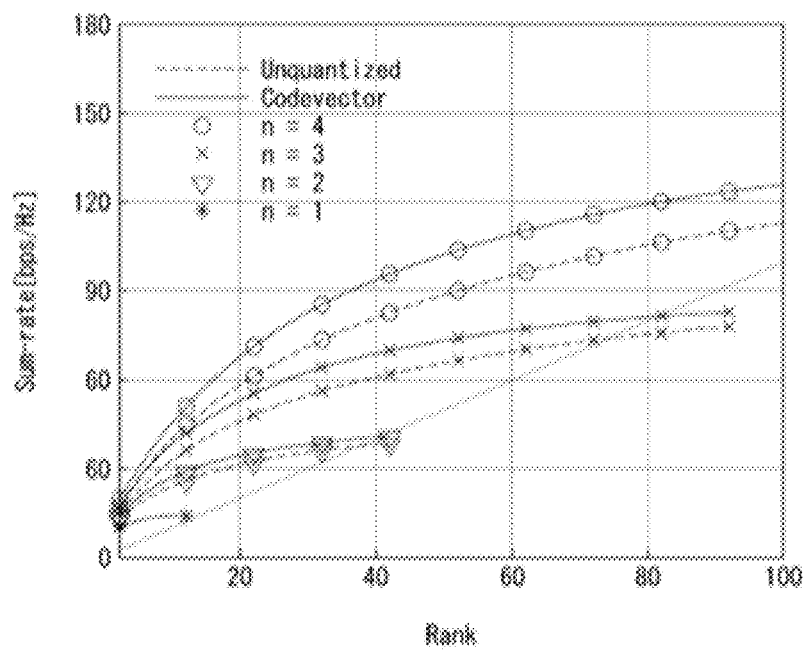
【FIG. 22】
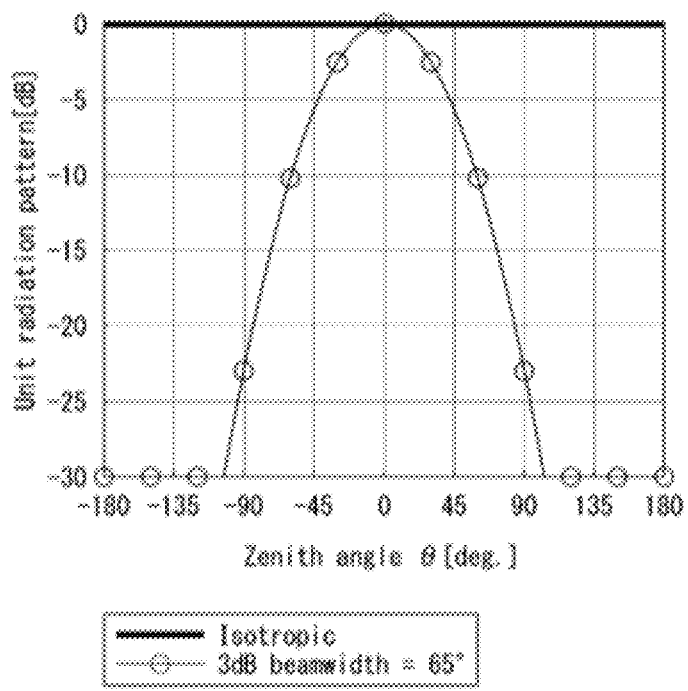

[FIG. 23]
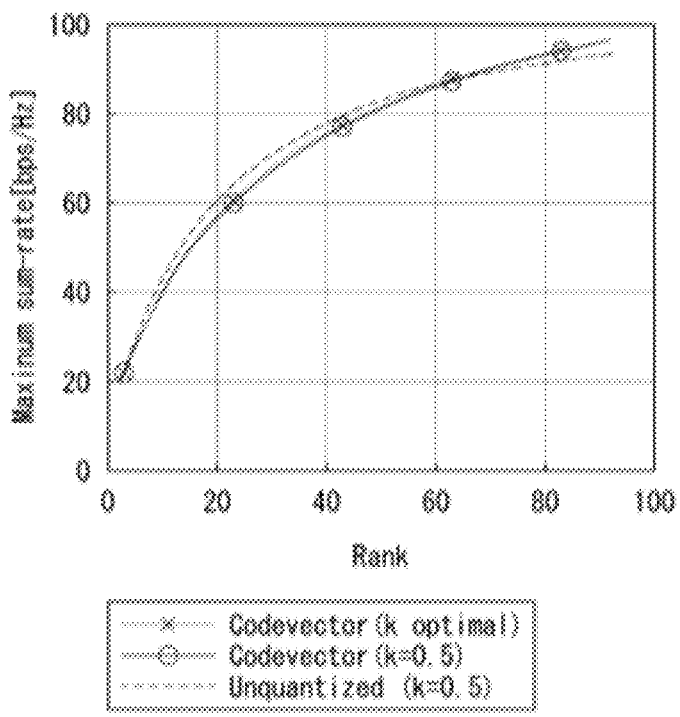
[FIG. 24]
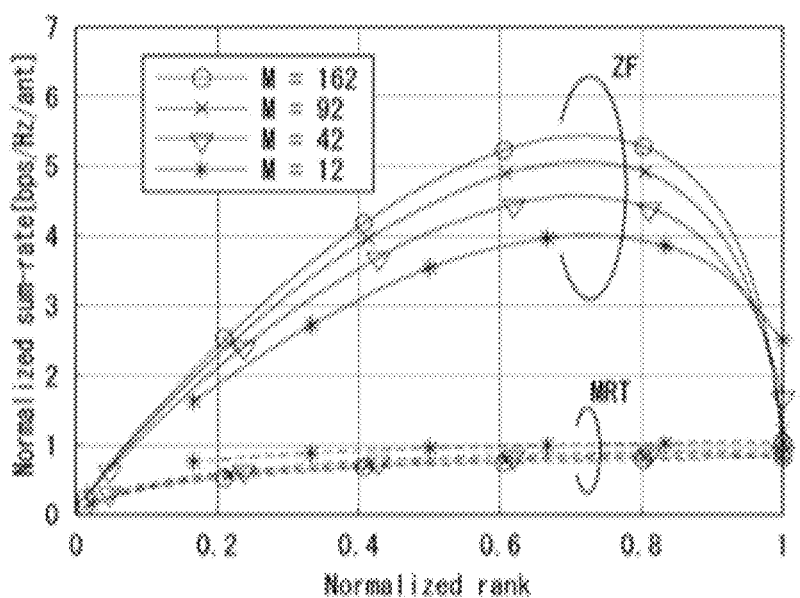

【FIG. 25】
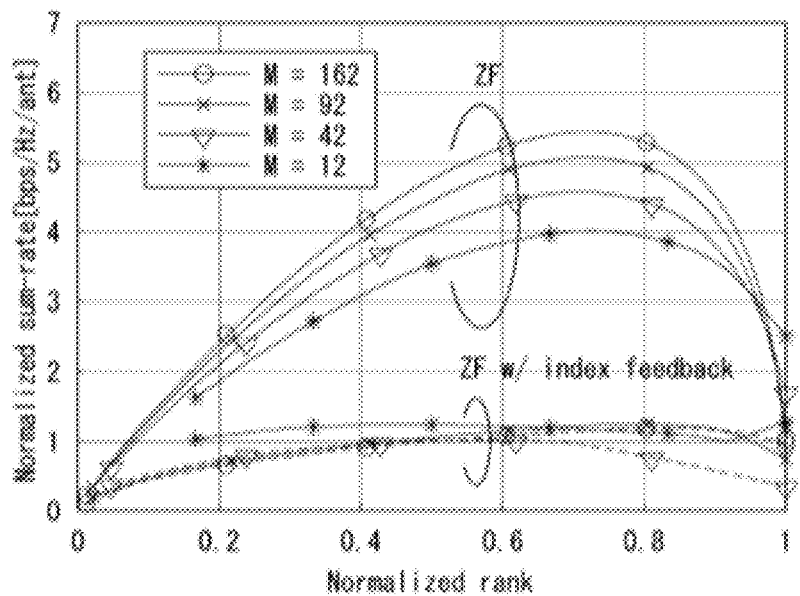
【FIG. 26】
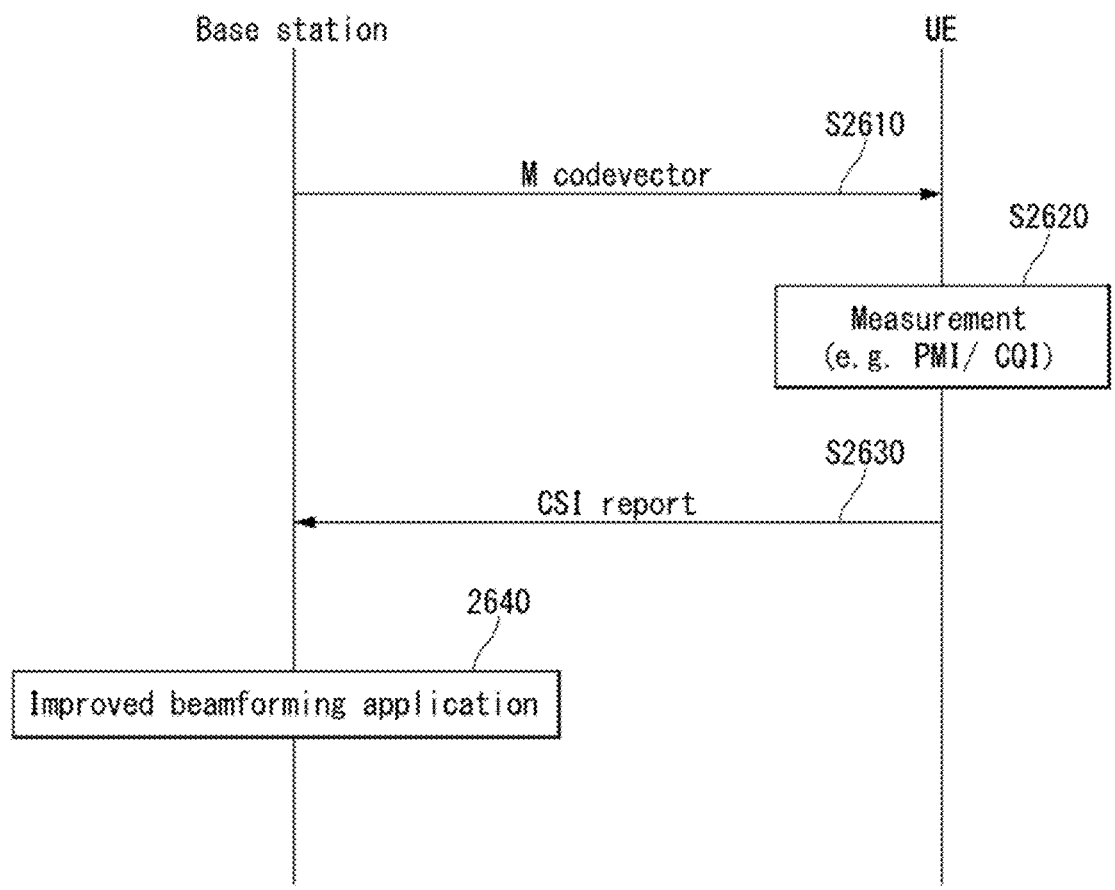

[FIG. 27]
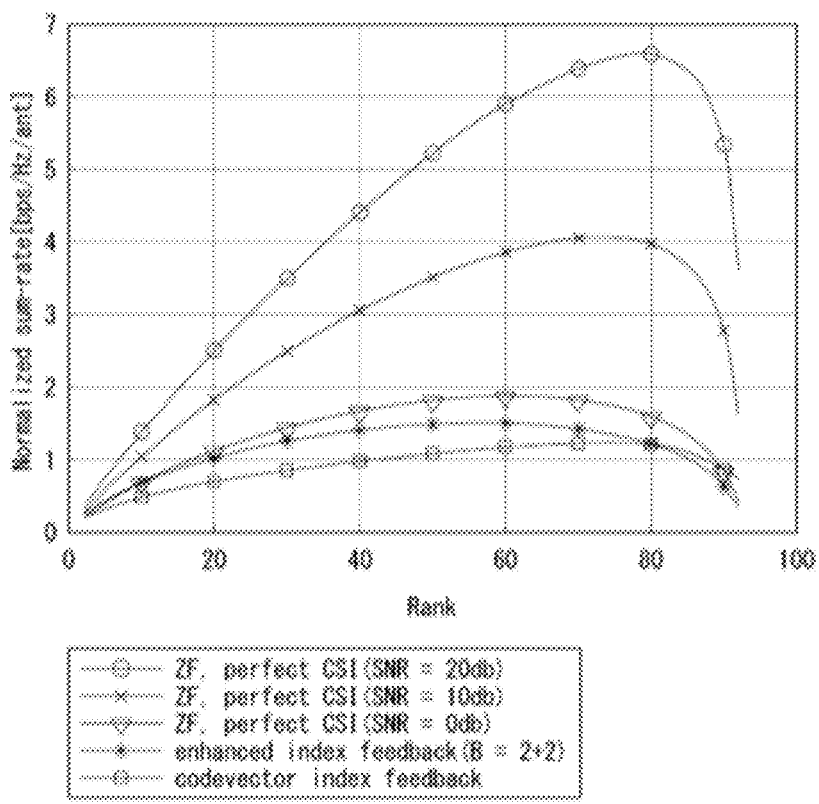
[FIG. 28]
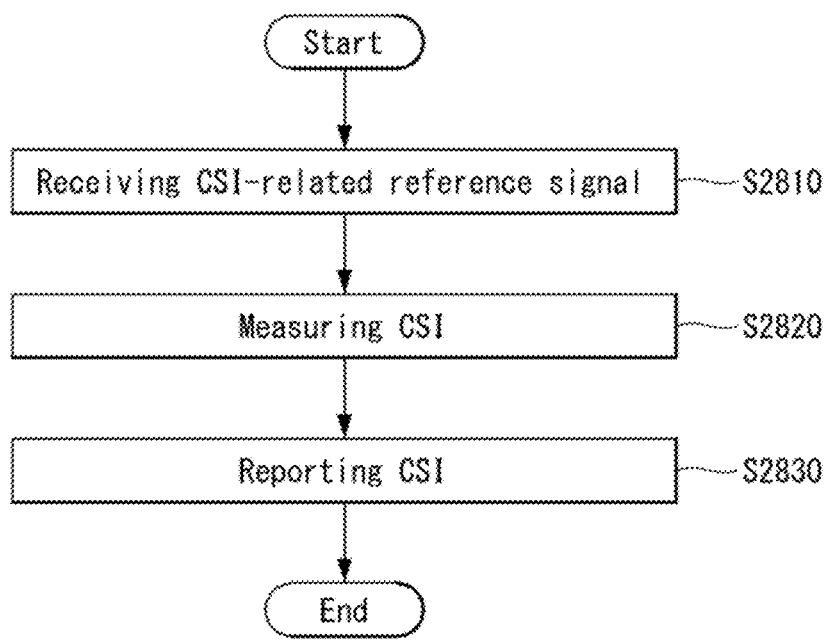

[FIG. 29]
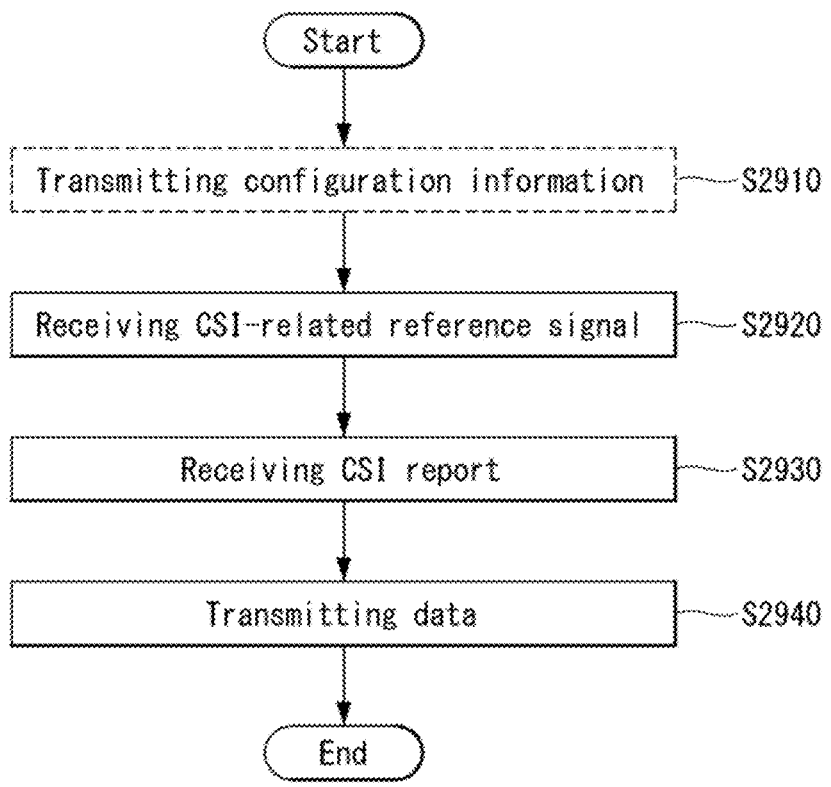

【FIG. 30】
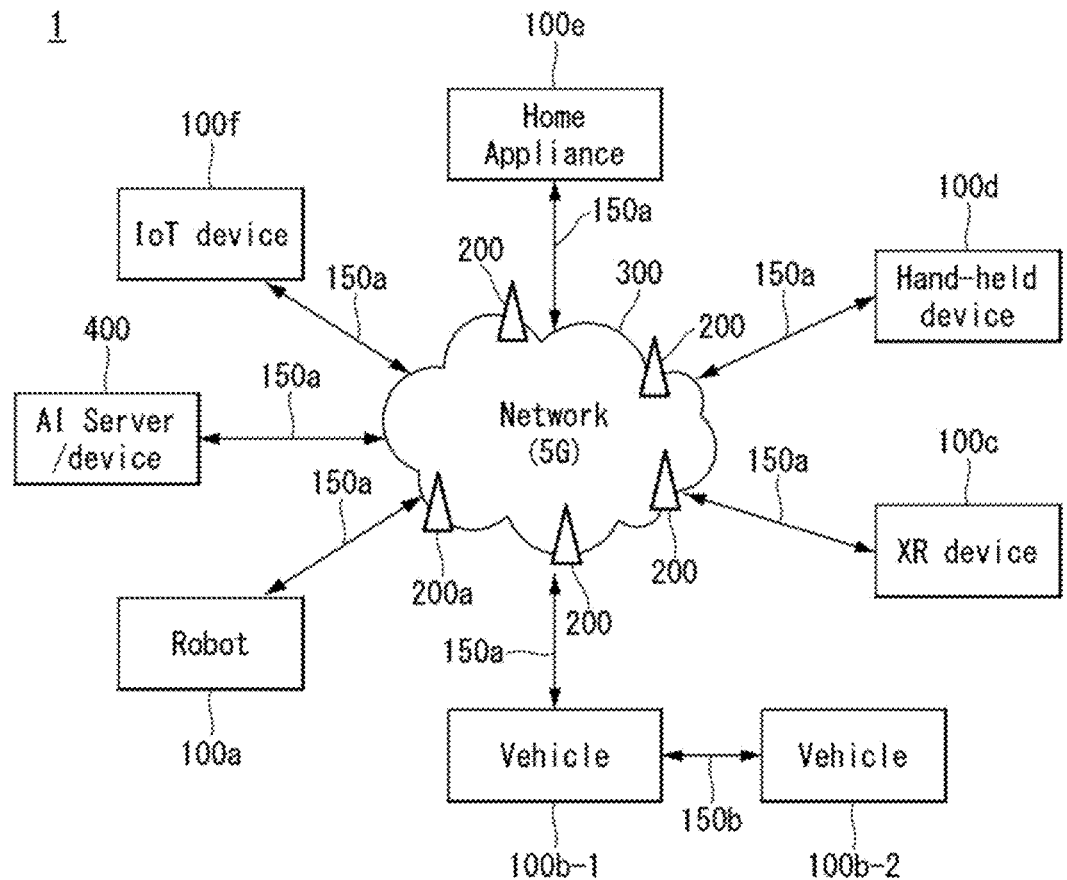
【FIG. 31】
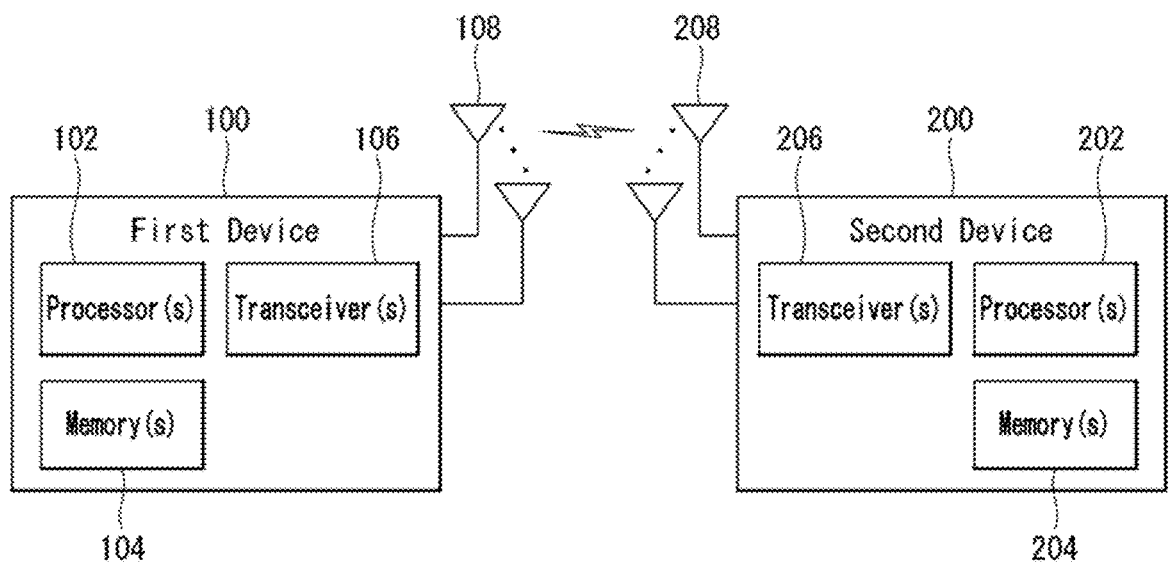

[FIG. 32]
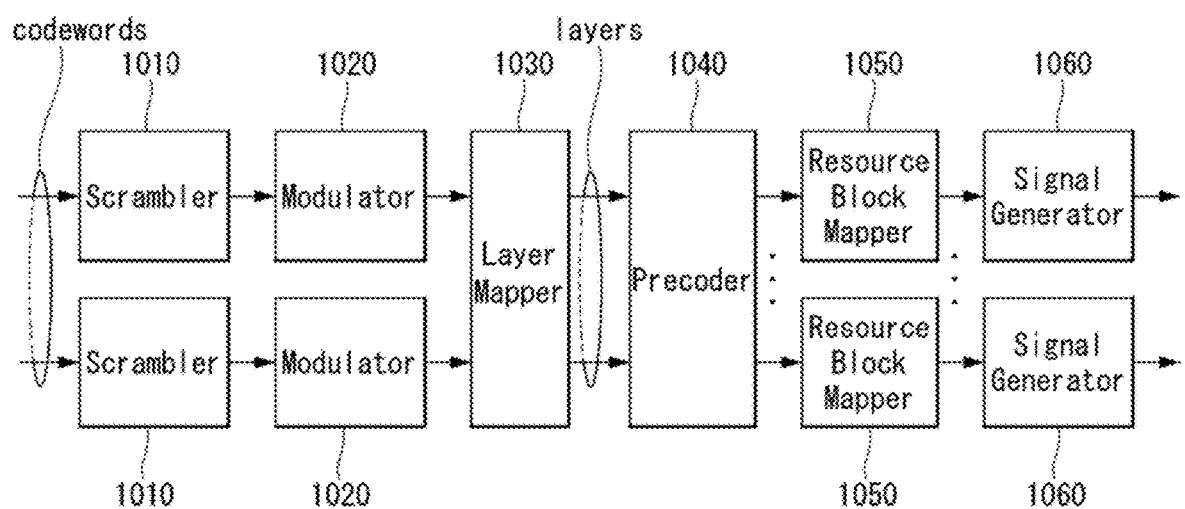
[FIG. 33]
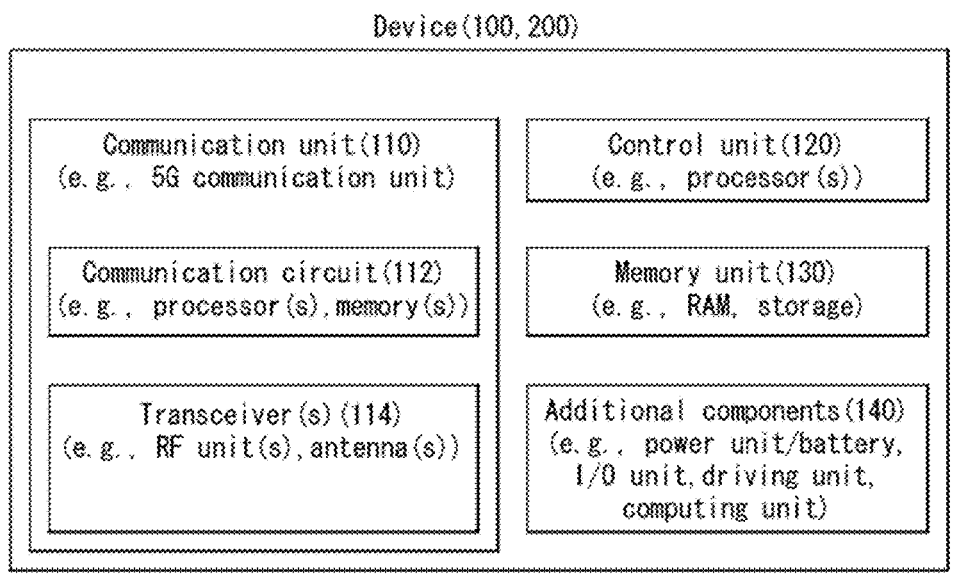

[FIG. 34]
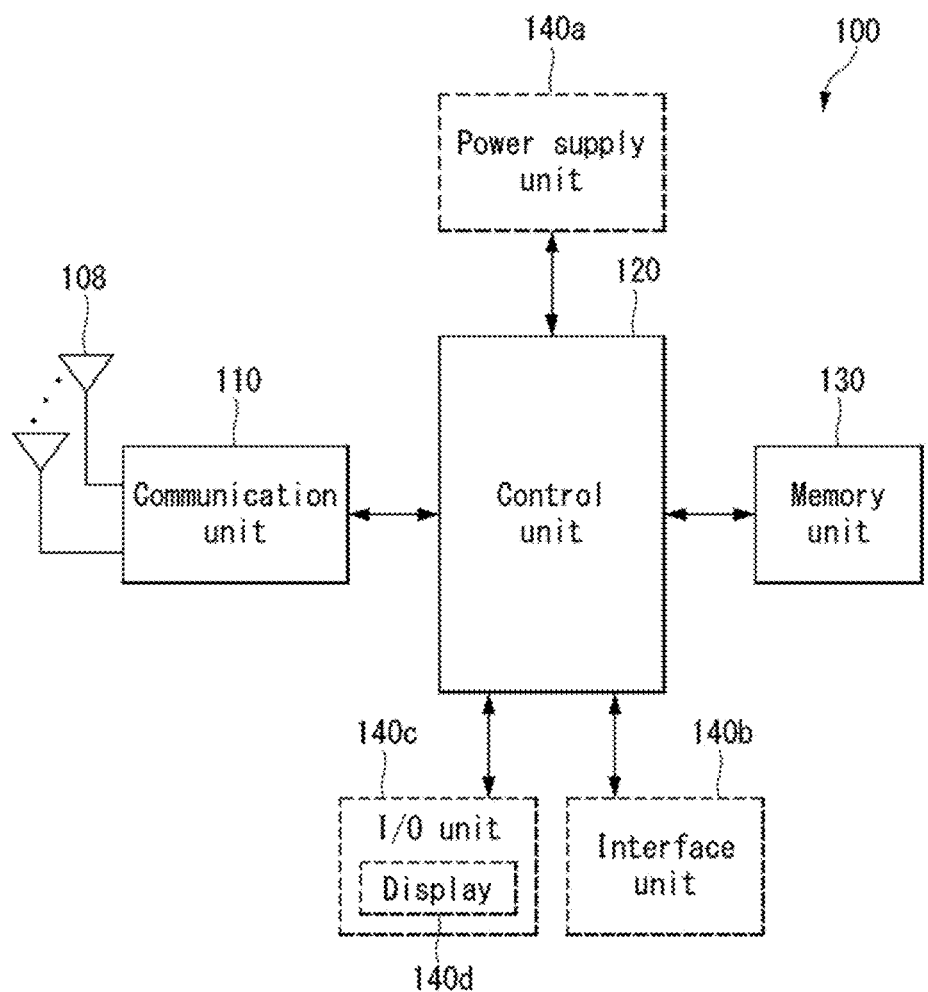

[FIG. 35]
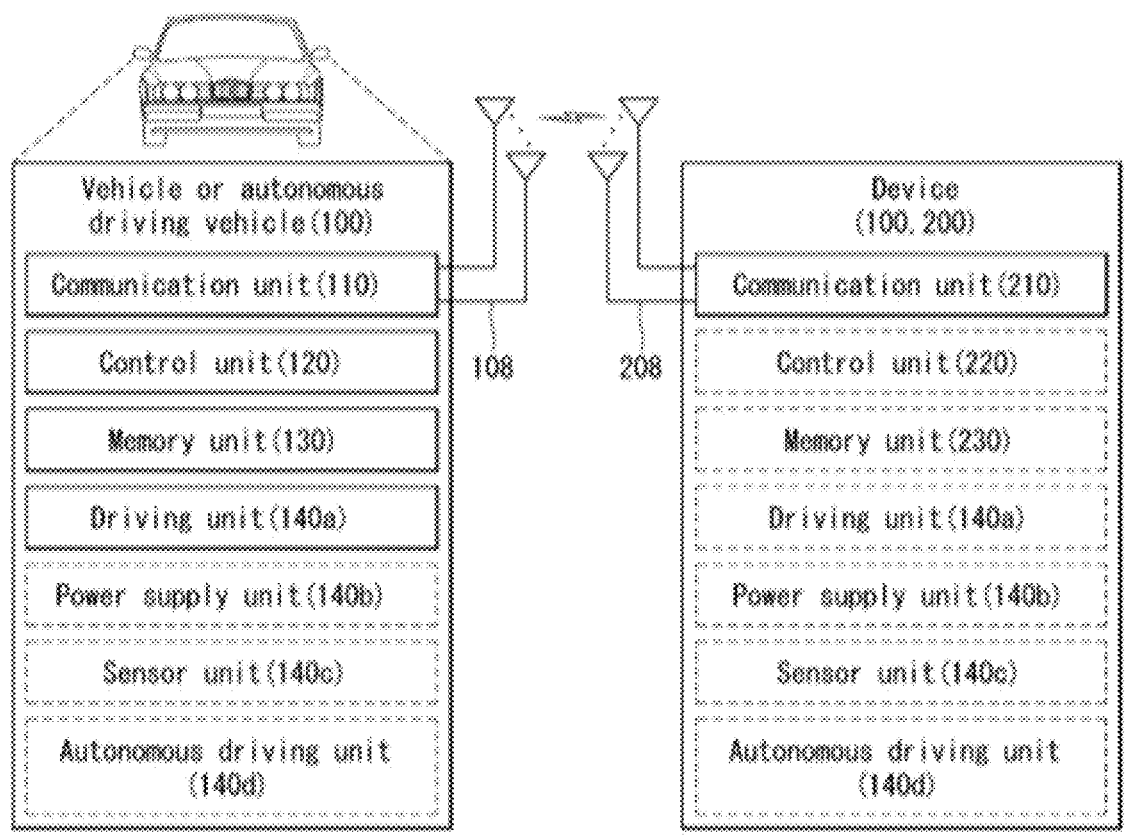

METHOD FOR REPORTING CHANNEL STATE INFORMATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/009711, filed on Jul. 23, 2020, which also claims the benefit of earlier filing date and right of priority to Korean Application No. 10-2019-0089183, filed on Jul. 23, 2019, the contents of which are all incorporated by reference herein in their entirety.

TECHNICAL FIELD

The present disclosure relates to a method for reporting channel state information in a wireless communication system, and more specifically, to a codebook design method considering a three-dimensionally shaped antenna array and a method for reporting channel state information based on a codebook and a device supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure provides a method for reporting channel state information (CSI) in a wireless communication system.

Specifically, the present disclosure proposes a method of constructing a uniform spherical array through geodesic division of a regular polyhedron and a beamforming method using the same.

In addition, the present disclosure proposes a codebook design method considering a three-dimensionally shaped antenna array.

In addition, the present disclosure proposes a method for reporting channel state information based on the codebook.

Technical problems to be solved by the present disclosure are not limited by the above-mentioned technical problems, and other technical problems which are not mentioned above can be clearly understood from the following description by those skilled in the art to which the present disclosure pertains.

Technical Solution

In a method for reporting channel state information (CSI), the method performed by a user equipment (UE) in a wireless communication system according to an embodiment of the present disclosure, the method comprises receiving a CSI-related reference signal; measuring the CSI based on the reference signal and a codebook; and reporting the CSI, wherein reception and transmission operations of the UE are performed based on a three-dimensionally shaped antenna array formed by arranging a plurality of antenna elements in a three-dimensional configuration, and wherein the codebook is generated based on a path difference between a distance from an origin, which is a center of the three-dimensional shape, to the UE and a distance from a specific antenna element to the UE.

In addition, in the method according to an embodiment of the present disclosure, the path difference is expressed as $d_m(\kappa, \Phi) = -R(\sin \Theta \sin \theta_m \cos(\Phi - \phi_m) + \cos \Theta \cos \theta_m)$, where, m may be an index of the specific antenna element, $\Theta, \Phi$ may be a zenith angle and an azimuth angle of the UE, respectively, $\theta_m, \phi_m$ may be the zenith angle and the azimuth angle of the specific antenna element, respectively, and R may be a distance between the origin and each antenna element.

In addition, in the method according to an embodiment of the present disclosure, the codebook may be composed of codevectors corresponding to a number of the plurality of antenna elements.

In addition, in the method according to an embodiment of the present disclosure, a codevector v constituting the codebook may be expressed by the following equation.

$$v_m = v(\theta_m, \phi_m) = \left[ e^{-j\frac{2\pi}{\lambda}d_0(\theta_m,\phi_m)} e^{-j\frac{2\pi}{\lambda}d_1(\theta_m,\phi_m)} \ldots e^{-j\frac{2\pi}{\lambda}d_{M-1}(\theta_m,\phi_m)} \right]^T,$$
$$m = 0, 1, \ldots, M-1$$

Where M may be the number of the plurality of antenna elements, and may be a wavelength according to a carrier frequency through which the reference signal is transmitted.

In addition, in the method according to an embodiment of the present disclosure, a codevector v constituting the codebook may be expressed by the following equation.

$$v_m = v(\theta_m, \phi_m) = \left[ e^{j\frac{2\pi}{\lambda}d_0(\theta_m,\phi_m)} e^{j\frac{2\pi}{\lambda}d_1(\theta_m,\phi_m)} \ldots e^{j\frac{2\pi}{\lambda}d_{M-1}(\theta_m,\phi_m)} \right]^T,$$
$$m = 0, 1, \ldots, M-1$$

Where M is the number of the plurality of antenna elements, and expresses a wavelength according to a carrier frequency through which the reference signal is transmitted.

In addition, in the method according to an embodiment of the present disclosure, the measuring the CSI may include measuring received power based on the reference signal, and the reported CSI may include (i) an index of a first codevector corresponding to a maximum received power and (ii) an index of a second codevector and a third codevector adjacent to the first codevector.

In addition, in the method according to an embodiment of the present disclosure, the reported CSI may further include a channel quality indicator (CQI) corresponding to each of the first codevector, the second codevector, and the third codevector.

In addition, in the method according to an embodiment of the present disclosure, the reference signal may include information on the codevectors.

In addition, in the method according to an embodiment of the present disclosure, the codebook may be composed of a number of codevectors greater than or equal to the number of the plurality of antenna elements, and may further include receiving information on the number of the codevectors.

In addition, in the method according to an embodiment of the present disclosure, the three-dimensional shape may be a three-dimensional spherical shape formed based on a geodesic polyhedron. In addition, in the method according to an embodiment of the present disclosure, each antenna element of the plurality of antenna elements may be disposed at a position corresponding to a dividing point generated by equally dividing an angle between one side of a regular polyhedron constituting the geodesic polyhedron and a center of the regular polyhedron.

In addition, in the method according to an embodiment of the present disclosure, the method may further include receiving information on a number of divisions to constitute the geodesic polyhedron.

In addition, in the method according to an embodiment of the present disclosure, a distance between a first antenna element and a second antenna element may be a wavelength/2 according to a carrier frequency through which the reference signal is transmitted.

In a user equipment (UE) reporting channel state information (CSI) in a wireless communication system according to an embodiment of the present disclosure, the UE comprises one or more transceivers; one or more processors; and one or more memories storing instructions for operations executed by the one or more processors and connected to the one or more processors, wherein the operations includes: receiving a CSI-related reference signal; measuring the CSI based on the reference signal and a codebook; and reporting the CSI, wherein the operations are performed based on a three-dimensionally shaped antenna array formed by arranging a plurality of antenna elements in a three-dimensional configuration, and wherein the codebook is generated based on a path difference between a distance from an origin, which is a center of the three-dimensional shape, to the UE and a distance from a specific antenna element to the UE.

In a method for receiving channel state information (CSI), the method performed by a base station (BS) in a wireless communication system according to an embodiment of the present disclosure, the method comprises transmitting, to a user equipment (UE), a CSI-related reference signal; and receiving the CSI from the UE, wherein reception and transmission operations of the BS are performed based on a three-dimensionally shaped antenna array formed by arranging a plurality of antenna elements in a three-dimensional configuration, wherein the CSI is measured based on the reference signal and a codebook, and wherein the codebook is generated based on a path difference between a distance from an origin, which is a center of the three-dimensional shape, to the UE and a distance from a specific antenna element to the UE.

In a base station receiving channel state information (CSI) in a wireless communication system according to an embodiment of the present disclosure, the base station comprises one or more transceivers; one or more processors; and one or more memories storing instructions for operations executed by the one or more processors and connected to the one or more processors, wherein the operations includes transmitting, to a user equipment (UE), a CSI-related reference signal; and receiving the CSI from the UE, wherein reception and transmission operations of the BS are performed based on a three-dimensionally shaped antenna array formed by arranging a plurality of antenna elements in a three-dimensional configuration, wherein the CSI is measured based on the reference signal and a codebook, and wherein the codebook is generated based on a path difference between a distance from an origin, which is a center of the three-dimensional shape, to the UE and a distance from a specific antenna element to the UE.

In a device comprising one or more memories and one or more processors functionally connected to the one or more memories according to an embodiment of the present disclosure, the one or more processors is configured to control the device to receive a CSI-related reference signal, measure CSI based on the reference signal and a codebook, and report the CSI, wherein reception and transmission operations of the device are performed based on a three-dimensionally shaped antenna array formed by arranging a plurality of antenna elements in a three-dimensional configuration, and wherein the codebook is generated based on a path difference between a distance from an origin, which is a center of the three-dimensional shape, to the UE and a distance from a specific antenna element to the UE.

In one or more non-transitory computer-readable medium storing one or more instructions according to an embodiment of the present disclosure, the one or more instructions, which are executable by one or more processors, include an instruction instructing a user equipment (UE) to receive a CSI-related reference signal, measure the CSI based on the reference signal and a codebook, and report the CSI, wherein reception and transmission operations of the UE are performed based on a three-dimensionally shaped antenna array formed by arranging a plurality of antenna elements in a three-dimensional configuration, and wherein the codebook is generated based on a path difference between a distance from an origin, which is a center of the three-dimensional shape, to the UE and a distance from a specific antenna element to the UE.

Advantageous Effects

According to an embodiment of the present disclosure, it is possible to configure a three-dimensionally shaped antenna array. In addition, stable beamforming may be performed in all directions in a three-dimensional space.

In addition, according to an embodiment of the present disclosure, it is possible to generate a codebook suitable for a three-dimensionally shaped antenna array.

In addition, according to an embodiment of the present disclosure, it is possible to report channel state information using the generated codebook.

In addition, according to an embodiment of the present disclosure, it is possible to form an optimal beam for a location of a UE. Therefore, even in a communication environment that experiences a large range of incident angle change, such as a drone, beamforming can be performed quickly and stably using the converted codebook.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 is a flowchart for illustrating a downlink beam management procedure using SSB.

FIG. 8 illustrates an example of a downlink beam management procedure using a Channel State Information-Reference Signal (CSI-RS).

FIG. 9 is a flowchart showing an example of a receive beam determination process of a UE.

FIG. 10 is a flowchart showing an example of a transmit beam determination process of an eNB.

FIG. 11 illustrates an example of resource allocation in time and frequency domains associated with FIG. 8's operation.

FIG. 12 illustrates an example of an uplink beam management procedure using a Sounding Reference Signal (SRS).

FIG. 13 is a flowchart showing an example of an uplink beam management procedure using the SRS.

FIG. 14 is a flowchart showing an example of a CSI-related procedure.

FIG. 15 illustrates an example of downlink transmission/reception operation.

FIG. 16 is a flowchart showing an example of an uplink transmission/reception operation to which a method proposed in the present disclosure may be applied.

FIG. 17 is an example of a geodesic polyhedron generated by dividing an icosahedron.

FIG. 18 shows an example of mutual interference values for two beam directions randomly distributed on a three-dimensional space using geodesic arrays.

FIG. 19 shows an example of a direction of some beams with respect to an icosahedron-based geodesic array to which a method proposed in the present disclosure can be applied.

FIG. 20 shows an example of an average value of interference magnitudes between adjacent codevectors according to a change in a distance between antennas.

FIG. 21 shows an example of a sum-rate when performing multi-rank transmission using a spherical array and a codebook proposed in the present disclosure.

FIG. 22 shows an example of a gain pattern when the gain pattern for each antenna is isotropic and when the 3 dB beamwidth is 65 degrees.

FIG. 23 shows an example of sum-rate performance when a 155 degree beamwidth is applied and the number of antennas used for each rank is limited to half for a geodesic array with a division number n=3.

FIG. 24 is an example illustrating multi-rank transmission performance using MRT and ZF beamforming for four geodesic arrays having different antenna numbers.

FIG. 25 is an example illustrating multi-rank transmission performance using ZF beamforming and ZF beamforming when using a codebook index for four geodesic arrays having different numbers of antennas.

FIG. 26 shows an example of a signaling operation sequence between a UE and a base station to which a method proposed in the present disclosure can be applied.

FIG. 27 is an example illustrating improved transmission performance when additional CSI signaling is performed for a geodesic array with a division number n=3.

FIG. 28 shows an example of an operation flowchart of a user equipment (UE) performing CSI reporting to which a method and/or embodiment proposed in the present disclosure can be applied.

FIG. 29 shows an example of an operation flowchart of a base station receiving CSI to which a method and/or embodiment proposed in the present disclosure can be applied.

FIG. 30 illustrates a communication system 1 applied to the present disclosure.

FIG. 31 illustrates a wireless device applicable to the present disclosure.

FIG. 32 illustrates a signal process circuit for a transmission signal.

FIG. 33 illustrates another example of a wireless device applied to the present disclosure.

FIG. 34 illustrates a portable device applied to the present disclosure.

FIG. 35 exemplifies a vehicle or an autonomous driving vehicle to which the present disclosure is applied.

MODE FOR INVENTION

A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), AR (Augmented Reality) device, VR (Virtual Reality) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, an Unmanned Aerial Vehicle (UAV), AR (Augmented Reality) device, VR (Virtual Reality) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the present disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | Δf = $2^μ$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slot,\mu}-1\}$ within a subframe and are numbered in increasing order of $n_{s,f}^\mu \in \{0, \ldots, N_{frame}^{slot,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of 14·2µ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology µ and antenna port p.

FIG. 5 illustrates examples of a resource grid per antenna port and numerology to which a method proposed in the present disclosure is applicable.

Each element of the resource grid for the numerology µ and the antenna port p is called a resource element and is uniquely identified by an index pair (k,l̄), where k=0, . . . , $N_{RB}^{\mu} N_{sc}^{RB}-1$ is an index on a frequency domain, and l̄=0, . . . $2^{\mu} N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l̄) for the numerology µ and the antenna port p corresponds to a complex value $a_{k,j}^{(p,\mu)}$. When there is no risk for confusion or when a specific antenna port or numerology is not specified, the indexes p and µ may be dropped, and as a result, the complex value may be $a_{k,j}^{(p)}$ or $a_{k,j}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration µ.

The center of subcarrier 0 of common resource block 0 for the subcarrier spacing configuration µ coincides with 'point A'. A common resource block number $n_{CRB}^{\mu}$ in the frequency domain and resource elements (k, l) for the subcarrier spacing configuration µ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and defines the corresponding partial bandwidth as the bandwidth part (BWP) for convenience. The BWP may be constituted by consecutive resource blocks (RBs) on the frequency axis and may correspond to one numerology (e.g., sub-carrier spacing, CP length, slot/mini-slot duration).

Meanwhile, the eNB may configure multiple BWPs even in one CC configured to the UE. As one example, a BWP occupying a relatively small frequency domain may be configured in a PDCCH monitoring slot and a PDSCH indicated in PDCCH may be scheduled onto a BWP larger therethan. Alternatively, when UEs are concentrated on a specific BWP, some UEs may be configured to other BWPs for load balancing. Alternatively, a partial spectrum of the entire bandwidth may be excluded and both BWPs may be configured even in the same slot by considering frequency domain inter-cell interference cancellation between neighboring cells. In other words, the eNB may configure at least one DL/UL BWP to the UE associated with the wideband CC and activate at least one DL/UL BWP (by L1 signaling or MAC CE or RRC signaling) among configured DL/UL BWP(s) at a specific time and switching may be indicated to another configured DL/UL BWP (by L1 signaling or MAC CE or RRC signaling) or when a timer value is expired based on a timer, the timer value may be switched to the DL/UL BWP. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in the NR system DCI format 0_0, DCI format 0_1 are used for scheduling the PUSCH in one cell, and DCI format 1_0, DCI format 1_1 are used for scheduling the PUSCH in one cell. Information included in the DCI format 0_0 is CRC scrambled and transmitted by C-RNTI or CS-RNTI or MCS-C-RNTI. And, DCI format 0_1 is used to reserve the PUSCH in one cell. Information included in the DCI format 0_1 is CRC scrambled and transmitted by C-RNTI or CS-RNTI or SP-CSI-RNTI or MCS-C-RNTI. DCI format 1_0 is used for scheduling the PDSCH in one DL cell. Information included in the DCI format 1_0 is CRC scrambled and transmitted by C-RNTI or CS-RNTI or MCS-C-RNTI. DCI format 1_1 is used for scheduling the PDSCH in one cell. Information included in the DCI format 1_1 is CRC scrambled and transmitted by C-RNTI or CS-RNTI or MCS-C-RNTI. DCI format 2_1 is used for informing PRB(s) and OFDM symbol(s) that the UE may assume that transmission is not intended. The information such as preemption indication 1, preemption indication 2, . . . , preemption indication N included in the DCI format 2_1 is CRC scrambled and transmitted by INT-RNTI.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

DL Beam Management (DL BM) Procedure

The DL BM procedure may include (1) transmission of beamformed DL reference signals (RSs) (e.g., CIS-RS or SS Block (SSB)) of the eNB and (2) beam reporting of the UE. Here, the beam reporting a preferred DL RS identifier (ID)(s) and L1-Reference Signal Received Power (RSRP). The DL RS ID may be an SSB Resource Indicator (SSBRI) or a CSI-RS Resource Indicator (CRI).

A SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping. The Rx beam sweeping using the SSB may be performed while the UE changes the Rx beam for the same SSBRI across multiple SSB bursts. Here, one SS burst includes one or more SSBs and one SS burst set includes one or more SSB bursts.

DL BM Using SSB

FIG. 7 is a flowchart showing an example of a downlink beam management procedure using SSB.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S710).

Table 5 shows an example of CSI-ResourceConfig IE and as shown in Table 5, a BM configuration using the SSB is not separately defined and the SSB is configured like the CSI-RS resource.

TABLE 5

```
-- ASN1START
-- TAG-CSI-RESOURCECONFIG-START
CSI-ResourceConfig ::=                  SEQUENCE {
    csi-ResourceConfigId                CSI-ResourceConfigId,
    csi-RS-ResourceSetList              CHOICE {
      nzp-CSI-RS-SSB                    SEQUENCE {
        nzp-CSI-RS-ResourceSetList          SEQUENCE (SIZE
(1. .maxNrofNZP-CSI-RS-ResourceSetsPerConfig) ) OF NZP-CSI-RS-ResourceSetId
OPTIONAL,
        csi-SSB-ResourceSetList             SEQUENCE (SIZE
(1. .maxNrofCSI-SSB-ResourceSetsPerConfig) ) OF CSI-SSB-ResourceSetIdOPTIONAL
      },
      csi-IM-ResourceSetList            SEQUENCE (SIZE (1. .maxNrofCSI-IM-
ResourceSetsPerConfig) ) OF CSI-IM-ResourceSetId
    },
    bwp-Id                              BWP-Id,
    resourceType                        ENUMERATED { aperiodic, semiPersistent,
periodic },
    ...
}
-- TAG-CSI-RESOURCECONFIGTOADDMOD-STOP
-- ASN1STOP
```

In Table 5, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S720).

When CSI-RS reportConfig associated with reporting of SSBRI and L1-RSRP is configured, the UE (beam) reports to the eNB best SSBRI and L1-RSRP corresponding thereto (S730). In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'. Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

DL BM Procedure Using CSI-RS

When (higher layer parameter) repetition is configured to 'ON', it is associated with the Rx beam sweeping procedure of the UE. When the UE receives a configuration of NZP-CSI-RS-ResourceSet with (higher layer parameter) repetition configured to 'ON', the UE may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted to different OFDM symbols or transmitted in different frequency domain (i.e. through FDM). When the UE is a multi-panel UE, at least one CSI-RS resource is a target of FDM. The UE does not expect that different periodicities are received at periodicityAndOffset in all CSI-RS resources in NZP-CSI-RS-Resourceset.

When repetition is configured to 'OFF', the repetition is associated with the Tx beam sweeping procedure of the eNB. In addition, when repetition is configured to 'OFF', the UE does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through different Tx beams.

In addition, the parameter repetition may be configured only for CSI-RS resource sets associated with CSI-ReportConfig having L1 RSRP or "No Report or None".

When the UE is configured with CSI-ReportConfig in which reportQuantity is configured as 'cri-RSRP' or 'none', the UE may be configured only with the same number of port (1-port or 2-port) having higher layer parameter 'nrofPorts' for all CSI-RS resources in NZP-CSI-RS-ResourceSet. Here, CSI-ResourceConfig does not include the higher layer parameter "trs-Info" but includes NZP-CSI-RS-ResourceSet configured to the higher layer parameter "repetition" (=ON).

More specifically, with respect to the purpose of the CSI-RS, if parameter repetition is configured and TRS_info is not configured in a specific CSI-RS resourceset, the CSI-RS is used for beam management. In addition, if parameter repetition is not configured and TRS_info is configured, the CSI-RS is used as a TRS (Tracking Reference Signal). In addition, if neither parameter repetition nor TRS_info is configured, the CSI-RS is used for CSI acquisition.

FIG. 8 illustrates an example of a downlink beam management procedure using a Channel State Information-Reference Signal (CSI-RS).

(a) of FIG. 8 illustrates an Rx beam determination (or refinement) procedure of the UE and (b) of FIG. 8 illustrates a Tx beam sweeping procedure of the eNB. Further, (b) of FIG. 8 illustrates a case where the repetition parameter is configured to 'ON' and (b) of FIG. 8 illustrates a case where the repetition parameter is configured to 'OFF'.

The DL beam pair determination procedure may consist of a combination of a TRP Tx beam determination procedure in which the base station transmits a DL RS corresponding to a plurality of TRP Tx beams, and the UE selects and/or reports one of them and a procedure for determining a UE Rx beam by repeatedly transmitting the same RS signal corresponding to each TRP Tx beam and measuring the repeatedly transmitted signals with different UE Rx beams.

Referring to (a) of FIG. 8 and FIG. 9, an Rx beam determination process of the UE will be described. FIG. 9 is a flowchart showing an example of a RX beam determination process of a UE in the DL BM procedure using CSI-RS.

In the FIG. 9, the UE receives, from the eNB, NZP CSI-RS resource set IE including higher layer parameter repetition through RRC signaling (S910). Here, the repetition parameter is configured to 'ON'. The UE repeatedly receives a resource(s) in CSI-RS resource set configured as repetition 'ON' in different OFDM symbols through the same Tx beam (or DL spatial domain transmission filter) of the eNB (S920). The UE determines the Rx beam thereof (S930). The UE may skip a CSI report and transmit a CSI report including CRI/L1-RSRP to the eNB (S940). In this case, reportQuantity of CSI report config may be configured as "No report (or None)" or CRI and L1-RSRP". That is, when repetition is configured to "ON", the UE may skip the CSI report or report ID information (CRI) of a beam pair related priority beam and a quality value (L1-RSRP) thereof.

Referring to (b) of FIG. 8 and FIG. 10, a Tx beam determination process of the eNB will be described. FIG. 10 is a flowchart showing an example of a transmit beam determination process of an eNB.

The UE receives, from the eNB, NZP CSI-RS resource set IE including higher layer parameter repetition through RRC signaling (S1010). Here, the repetition parameter is configured to 'OFF' and associated with the Tx beam sweeping procedure of the eNB. The UE receives a resource(s) in CSI-RS resource set configured as repetition 'OFF' through different Tx beams (DL spatial domain transmission filters) of the eNB (S1020). The UE selects (or determines) a best beam (S1130), and reports to the eNB an ID for the selected beam and related quality information (e.g., L1-RSRP) (S1140). In this case, reportQuantity of CSI report config may be configured as 'CRI+L1-RSRP'. In other words, when the CSI-RS is transmitted for the BM, the UE reports to the eNB the CRI and L1-RSRP therefor.

FIG. 11 illustrates an example of resource allocation in time and frequency domains associated with FIG. 8's operation.

Referring to FIG. 11, when repetition 'ON' is configured in the CSI-RS resource set, a plurality of CSI-RS resources is repeatedly used via the same Tx beam. When repetition 'OFF' is configured in the CSI-RS resource set, different CSI-RS resources are transmitted via different Tx beams.

DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 6 shows an example of TCI-State IE.

The TCI-State IE is associated with a quasi co-location (QCL) type corresponding to one or two DL reference signals (RSs).

TABLE 6

```
--ASN1START
--TAG-TCI-STATE-START
TCI-State ::=       SEQUENCE {
  tci-StateId         TCI-StateId,
```

TABLE 6-continued

```
  qcl-Type1           QCL-Info,
  qcl-Type2           QCL-Info
    OPTIONAL, -- Need R
  ...
}
QCL-Info ::=        SEQUENCE {
  cell                ServCellIndex
    OPTIONAL, -- Need R
  bwp-Id              BWP-Id
    OPTIONAL, -- Cond CSI-RS-Indicated
  referenceSignal     CHOICE {
    csi-rs              NZP-CSI-RS-ResourceId,
    ssb                 SSB-Index
  },
  qcl-Type            ENUMERATED {typeA, typeB, typeC, typeD},
  ...
}
-- TAG-TCI-STATE-STOP
-- ASN1STOP
```

In Table 6, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The UE may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter QCL-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication".

UL BM Procedure

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K (≥1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 12 illustrates an example of a ULBM procedure using an SRS.

FIG. 12(a) illustrates an Rx beam determination procedure of the base station, and FIG. 12(b) illustrates a Tx beam sweeping procedure of the UE.

The UL beam pair determination procedure may consist of a combination of a UE Tx beam determination procedure in which the UE transmits UL RSs corresponding to a plurality of UE Tx beams, and the base station selects and/or signals one of them and a TRP Rx beam determination procedure in which the same RS signal corresponding to each UE Tx beam is repeatedly transmitted, and the repeatedly transmitted signals are measured with different TRP Rx beams.

FIG. 13 is a flowchart showing an example of a ULBM procedure using the SRS.

The UE receives, from the base station, RRC signaling (e.g., SRS-Config IE) including a (higher layer parameter) usage parameter configured as 'beam management' (S1310).

Table 7 shows an example of SRS-Config IE (Information Element) and SRS-Config 1E is used for an SRS transmission configuration. The SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 7

```
-- ASN1START
-- TAG-MAC-CELL-GROUP-CONFIG-START
SRS-Config ::=                          SEQUENCE {
    srs-ResourceSetToReleaseList        SEQUENCE (SIZE(1..maxNrofSRS-
ResourceSets)) OF SRS-ResourceSetId         OPTIONAL, --Need N
    srs-ResourceSetToAddModList         SEQUENCE (SIZE(1..maxNrofSRS-
ResourceSets)) OF SRS-ResourceSet           OPTIONAL, --Need N
    srs-ResourceToReleaseList           SEQUENCE (SIZE(1..maxNrofSRS-
Resources)) OF SRS-ResourceId               OPTIONAL, --Need N
    srs-ResourceToAddModList            SEQUENCE (SIZE(1..maxNrofSRS-
Resources)) OF SRS-Resource                 OPTIONAL, --Need N
    tpc-Accumulation                    ENUMERATED {disabled}
                                        OPTIONAL, --Need S
    ...
}
SRS-ResourceSet ::=                     SEQUENCE {
    srs-ResourceSetId                   SRS-ResourceSetId,
    srs-ResourceIdList                  SEQUENCE (SIZE(1..maxNrofSRS-
ResourcesPerSet)) OF SRS-ResourceId         OPTIONAL, --Cond Setup
    resourceType                        CHOICE {
        aperiodic                       SEQUENCE {
            aperiodicSRS-ResourceTrigger    INTEGER (1..maxNrofSRS-
TriggerStates-1),
            csi-RS                          NZP-CSI-RS-ResourceId
                                        OPTIONAL, --Cond NonCodebook
            slotOffset                      INTEGER (1..32)
                                        OPTIONAL, --Need S
    ...
},
```

TABLE 7-continued

```
  semi-persistent                    SEQUENCE {
    associatedCSI-RS                   NZP-CSI-RS-ResourceId
                                       OPTIONAL, --Cond NonCodebook
    ...
  },
  periodic                          SEQUENCE {
    associatedCSI-RS                   NZP-CSI-RS-ResourceId
                                       OPTIONAL, --Cond NonCodebook
    ...
  }
},
usage                               ENUMERATED [beam Management,
  codebook. nonCodebook. antennaSwitching},
  alpha                             Alpha
                                    OPTIONAL, --Need S
  p0                                INTEGER (-202..24)
                                    OPTIONAL, --Cond Setup
  pathlossReferenceRS               CHOICE {
    ssb-Index                         SSB-Index,
    csi-RS-Index                      NZP-CSI-RS-ResourceId
SRS-SpatialRelationInfo ::=         SEQUENCE {
  servingCellId                     ServCellIndex
  OPTIONAL, --Need S
  referenceSignal                   CHOICE {
    ssb-Index                         SSB-Index,
    csi-RS-Index                      NZP-CSI-RS-ResourceId,
    srs                               SEQUENCE {
      resourceId                        SRS-ResourceId,
      uplinkBWP                         BWP-Id
    }
  }
}
SRS-ResourceId ::=                  INTEGER (0..maxNrofSRS-Resources-1)
```

In Table 7, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1320). Here, SRS-SpatialRelation Info is configured for each SRS resource and represents whether to apply the same beam as the beam used in the SSB, the CSI-RS, or the SRS is to be applied for each SRS resource. In addition, SRS-SpatialRelationInfo may be configured or not configured in each SRS resource.

If SRS-SpatialRelationInfo is configured in the SRS resource, the UE transmits by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1330).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly to the above.

Additionally, the UE may receive or not receive a feedback for the SRS from the base station as in the following three cases (S1340).

i) When Spatial_Relation_Info is configured for all SRS resources in the SRS resource set, the UE transmits the SRS with the beam indicated by the base station. For example, when all Spatial_Relation_Info indicates the same SSB, CRI, or SRI, the UE repeatedly transmits the SRS with the same beam. This case as a usage of selecting the Rx beam by the base station corresponds to FIG. 12(a).

ii) Spatial_Relation_Info may not be configured for all SRS resources in the SRS resource set. In this case, the UE may transmit the SRS while arbitrarily changing the Tx beam. That is, this case as a usage of selecting the Tx beam by the UE corresponds to FIG. 12(b).

iii) Spatial_Relation_Info may be configured for some SRS resources in the SRS resource set. In this case, the SRS may be transmitted with the indicated for the configured SRS resource and the UE may arbitrarily apply the Tx beam and transmit it for SRS resource in which Spatial_Relation_Info is not configured.

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. Here, the CSI computation is related to CSI acquisition and the L1-RSRP computation is related to beam management (BM).

Channel state information (CSI) collectively refers to information that may indicate the quality of a radio channel (or referred to as a link) formed between the UE and the antenna port.

FIG. 14 is a flowchart showing an example of a CSI-related procedure.

Referring to FIG. 14, in order to perform one of usages of the CSI-RS, a terminal (e.g. user equipment (UE)) receives, from a base station (e.g. general Node B, gNB), configuration information related to the CSI through radio resource control (RRC) signaling (S1410).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information may be expressed as CSI-ResourceConfig IE. The CSI resource configuration related information defines a group including at least one of a non zero power (NZP) CSI-RS resource set, a CSI-IM resource set, or a CSI-SSB resource set. That is, the CSI resource configuration related information may include a CSI-RS resource set list, and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 8 shows an example of the NZP CSI-RS resource set IE. Referring to Table 8, parameters (e.g., a BM related 'repetition' parameter and a tracking related 'trs-Info' parameter) representing the usage of the CSI-RS may be configured for each NZP CSI-RS resource set.

TABLE 8

```
-- ASN1START
-- TAG-NZP-CSI-RS-RESOURCESET-START
NZP-CSI-RS-ResourceSet ::=  SEQUENCE {
    nzp-CSI-ResourceSetId           NZP-CSI-RS-ResourceSetId,
    nzp-CSI-RS-Resources            SEQUENCE (SIZE (1. .maxNrofNZP-CSI-RS-
ResourcesPerSet) ) OF NZP-CSI-RS-ResourceId,
    repetition                      ENUMERATED ( on, off }
    aperiodicTriggeringOffset       INTEGER (0. .4)
    trs-Info                        ENUMERATED (true}
    . . .
}
-- TAG-NZP-CSI-RS-RESOURCESET-STOP
-- ASN1STOP
```

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE and Table 9 below shows an example of CSI-ReportConfig IE.

TABLE 9

```
-- ASN1START
-- TAG-CSI-RESOURCECONFIG-START
CSI-ReportConfig ::=                    SEQUENCE {
    reportConfigId                      CSI-ReportConfigId,
    carrier                             ServCellIndex    OPTIONAL, -
- Need S
    resourcesForChannelMeasurement          CSI-ResourceConfigId,
    csi-IM-ResourcesForInterference         CSI-ResourceConfigId   OPTIONAL, -
- Need R
    nzp-CSI-RS-ResourcesForInterference     CSI-ResourceConfigId   OPTIONAL, -
- Need R
    reportConfigType                    CHOICE {
        periodic                            SEQUENCE {
            reportSlotConfig                    CSI-
ReportPeriodicityAndOffset,
            pucch-CSI-ResourceList              SEQUENCE (SIZE
(1..maxNrofBWPs)) OF PUCCH-CSI-Resource
        },
```

TABLE 9-continued

| | |
|---|---|
| semiPersistentOnPUCCH | SEQUENCE { |
| reportSlotConfig | CSI-ReportPeriodicityAndOffset, |
| pucch-CSI-ResourceList | SEQUENCE (SIZE (1..maxNrofBWPs)) OF PUCCH-CSI-Resource |
| }, | |
| semiPersistentOnPUSCH | SEQUENCE { |
| reportSlotConfig | ENUMERATED {s15, s110, s120, s140, s180, s1160, s1320}, |
| reportSlotOffsetList | SEQUENCE (SIZE (1 . . maxNrofUL-Allocations)) OF INTEGER (0. .32) , |
| p0alpha | P0-PUSCH-AlphaSetId |
| }, | |
| aperiodic | SEQUENCE { |
| reportSlotOffsetList | SEQUENCE (SIZE (1. .maxNrofUL-Allocations)) OF INTEGER(0. .32) |
| } | |
| }, | |
| reportQuantity | CHOICE { |
| none | NULL, |
| cri-RI-PMI-CQI | NULL, |
| cri-RI-i1 | NULL, |
| cri-RI-i1-CQI | SEQUENCE { |
| pdsch-BundleSizeForCSI | ENUMERATED {n2, n4} OPTIONAL |
| }, | |
| cri-RI-CQI | NULL, |
| cri-RSRP | NULL, |
| ssb-Index-RSRP | NULL, |
| cri-RI-LI-PMI-CQI | NULL |
| }, | |

The UE measures CSI based on configuration information related to the CSI (S1420). The CSI measurement may include (1) a CSI-RS reception process of the UE (S1421) and (2) a process of computing the CSI through the received CSI-RS (S1422), and a detailed description thereof will be given later.

For the CSI-RS, resource element (RE) mapping of the CSI-RS resource is configured in time and frequency domains by higher layer parameter CSI-RS-ResourceMapping.

Table 10 shows an example of CSI-RS-ResourceMapping IE.

In Table 10, a density (D) represents a density of the CSI-RS resource measured in RE/port/physical resource block (PRB) and nrofPorts represents the number of antenna ports.

The UE reports the measured CSI to the base station (S1430).

Here, when the quantity of CSI-ReportConfig in Table 10 is configured to 'none (or No report)', the UE may skip the report.

However, even when the quantity is configured to 'none (or No report)', the UE may report to the base station.

TABLE 10

| | |
|---|---|
| -- ASN1START | |
| -- TAG-CSI-RS-RESOURCEMAPPING-START | |
| CSI-RS-ResourceMapping ::= | SEQUENCE { |
| frequencyDomainAllocation | CHOICE { |
| row1 | BIT STRING (SIZE (4)), |
| row2 | BIT STRING (SIZE (12)), |
| row4 | BIT STRING (SIZE (3)), |
| other | BIT STRING (SIZE (6)) |
| }, | |
| nrofPorts | ENUMERATED {p1,p2,p4,p8,p12,p16,p24,p32}, |
| firstOFDMSymbolInTimeDomain | INTEGER (0. .13), |
| firstOFDMSymbolInTimeDomain2 | INTEGER (2. .12) |
| cdm-Type | ENUMERATED {noCDM, fd-CDM2, cdm4-FD2-TD2, cdm8-FD2-TD4}, |
| density | CHOICE { |
| dot5 | ENUMERATED {evenPRBs, oddPRBs} , |
| one | NULL, |
| three | NULL, |
| spare | NULL |
| }, | |
| freqBand | CSI-FrequencyOccupation, |
| . . . | |
| } | |

The case where the quantity is configured to 'none' is a case of triggering aperiodic TRS or a case where repetition is configured.

Here, only in a case where the repetition is configured to 'ON', the report of the UE may be skipped.

CSI Measurement

The NR system supports more flexible and dynamic CSI measurement and reporting. Here, the CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The base station transmits the precoded NZP CSI-RS to the UE on each port of the configured NZP CSI-RS based IMR.

The UE assumes a channel/interference layer for each port in the resource set and measures interference.

For the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList). The CSI resource setting corresponds to the CSI-RS-resourcesetlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to '1' with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, channel measurement resource (CMR) may be NZP CSI-RS for CSI acquisition and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

For aperiodic CSI, in each trigger state configured by using higher layer parameter CSI-AperiodicTriggerState, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is for channel measurement for L1-RSRP computation.

When two resource settings are configured, a first resource setting (given by higher layer parameter resourcesForChannelMeasurement) is for channel measurement and a second resource setting (given by csi-IM-ResourcesForInterference or nzp-CSI-RS-ResourcesForInterference) is for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is for channel measurement for L1-RSRP computation.

When two resource settings are configured, a first resource setting (given by resourcesForChannelMeasurement) is for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

The UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.
Each NZP CSI-RS port configured for interference measurement corresponds to an interference transport layer.
All interference transport layers of the NZP CSI-RS port for interference measurement consider an energy per resource element (EPRE) ratio.
Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the base station.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.

i) The periodic CSI reporting is performed on short PUCCH and long PUCCH. The periodicity and slot offset of the periodic CSI reporting may be configured through RRC and refer to the CSI-ReportConfig IE.

ii) SP (semi-periodic) CSI reporting is performed on short PUCCH, long PUCCH, or PUSCH.

In the case of SP CSI on the short/long PUCCH, the periodicity and the slot offset are configured with the RRC and the CSI reporting is activated/deactivated by separate MAC CE.

In the case of the SP CSI on the PUSCH, the periodicity of the SP CSI reporting is configured through the RRC, but the slot offset is not configured through the RRC and the SP CSI reporting is activated/deactivated by DCI (format 0_1). For SP CSI reporting on PUSCH, a separate RNTI (SP-CSI C-RNTI) is used.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. The SP CSI reporting has the same or similar activation/deactivation as a mechanism having data transmission on SPS PUSCH.

iii) The aperiodic CSI reporting is performed on the PUSCH and is triggered by the DCI. In this case, information related to the trigger of aperiodic CSI reporting may be delivered/indicated/configured through the MAC-CE.

In the case of AP CSI having AP CSI-RS, an AP CSI-RS timing is configured by the RRC, and a timing for the AP CSI reporting is dynamically controlled by the DCI.

In the NR, it is not applied a scheme (for example, transmitting RI, WB PMI/CQI, and SB PMI/CQI in order) of dividing and reporting the CSI in multiple reporting instances applied to PUCCH based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. In the case of Low latency CSI, it is a WB CSI including a maximum of 4 ports Type-I codebook or a maximum of 4-ports non-PMI feedback CSI. The high latency CSI refers to CSI other than the low latency CSI. For a normal UE, (Z, Z') is defined in a unit of OFDM symbols. Here, Z represents a minimum CSI processing time from the reception of the aperiodic CSI triggering DCI to the execution of the CSI reporting. In addition, Z' represents a minimum CSI processing time from the reception of the CSI-RS for channel/interference to the execution of the CSI reporting.

Additionally, the UE reports the number of CSIs which may be simultaneously calculated.

DL and UL Transmission/Reception Operation

DL Transmission/Reception Operation

FIG. 15 is a flowchart illustrating an example of a downlink transmission/reception operation.

Referring to FIG. 15, A base station schedules downlink transmission such as frequency/time resources, a transport layer, a downlink precoder, MCS, and the like (S1501). In particular, the base station may determine a beam for PDSCH transmission to the UE through the above-described beam management operations. In addition, The UE receives downlink control information (DCI: Downlink Control Information) for downlink scheduling (i.e., including scheduling information of the PDSCH) on a PDCCH from the base station (S1502). DCI format 1_0 or 1_1 may be used for downlink scheduling, in particular, DCI format 1_1 includes the following information: a DCI format identifier, a bandwidth part indicator, frequency domain resource assignment, time domain resource assignment, a PRB bundling size indicator, a rate matching indicator, ZP CSI-RS trigger, antenna port(s), transmission configuration indication (TCI), an SRS request, and demodulation reference signal (DMRS) sequence initialization, in particular, the number of DMRS ports may be scheduled, and SU (single-user)/MU (multi-user) transmission scheduling can be performed according to each state/index indicated in the antenna port(s) field. In addition, the TCI field consists of 3 bits, and the QCL for the DMRS is dynamically indicated by indicating a maximum of 8 TCI states according to the TCI field value. The UE receives downlink data from the base station on the PDSCH (S1503). When the UE detects a PDCCH including DCI format 1_0 or 1_1, the UE decodes the PDSCH according to an indication by the corresponding DCI.

Here, when the UE receives a PDSCH scheduled by DCI format 1_1, the UE may set a DMRS configuration type by a higher layer parameter 'dmrs-Type', and the DMRS configuration type is used to receive the PDSCH. In addition, the UE may set the maximum number of DMRS symbols front-loaded for the PDSCH by a higher layer parameter 'maxLength'.

In the case of DMRS configuration type 1, when a single codeword is scheduled for the UE and an antenna port mapped with an index of {2, 9, 10, 11 or 30} is specified, or two codewords are scheduled for the UE, the UE assumes that all remaining orthogonal antenna ports are not associated with PDSCH transmission to another UE. In the case of DMRS configuration type 2, if a single codeword is scheduled for the UE and an antenna port mapped with an index of {2, 10 or 23} is specified, or if two codewords are scheduled for the UE, the UE assumes that all the remaining orthogonal antenna ports are not associated with PDSCH transmission to another UE.

When the UE receives the PDSCH, it may assume precoding granularity P' to be consecutive resource blocks in the frequency domain. Here, P' may correspond to one of {2, 4, broadband}. If P' is determined to be wideband, the UE does not expect to be scheduled with non-contiguous PRBs and the UE may assume that the same precoding is applied to allocated resources. On the other hand, if P' is determined as any one of {2, 4}, a precoding resource block group (PRG) is divided into P' consecutive PRBs. The actual number of consecutive PRBs in each PRG may be one or more. The UE may assume that the same precoding is applied to consecutive downlink PRBs in the PRG.

In order for the UE to determine a modulation order, a target code rate, and a transport block size in the PDSCH, the UE first reads a 5-bit MCS field in the DCI and determines the modulation order and the target code rate. Then, the UE may read a redundancy version field in the DCI and determine a redundancy version. In addition, the UE determines the transport block size using the number of layers and the total number of allocated PRBs before rate matching.

The transport block may be composed of one or more code block groups (CBGs), and one CBG may be composed of one or more code blocks (CBs). In addition, in the NR system, not only data transmission/reception in units of transport blocks but also data transmission/reception in units of CB/CBG may be possible. Accordingly, ACK/NACK transmission and retransmission in units of CB/CBG may also be possible. The UE may receive information about CB/CBG from the base station through DCI (e.g., DCI format 0_1, DCI format 1_1, etc.). In addition, the UE may receive information about a data transmission unit (e.g., TB/CB/CBG) from the base station.

UL Transmission/Reception Operation

FIG. 16 is a flowchart showing an example of an uplink transmission/reception operation.

Referring to FIG. 16, the base station schedules uplink transmission such as frequency/time resources, transport layer, uplink precoder, MCS, and the like (S1601). In particular, the base station may determine a beam for the UE to transmit PUSCH through the above-described beam management operations. In addition, the UE receives DCI (i.e. including scheduling information of PUSCH) for uplink scheduling from the base station on the PDCCH (S1602). DCI format 0_0 or 0_1 may be used for uplink scheduling, in particular, DCI format 0_1 includes the following information: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, Uplink Shared Channel (UL-SCH) indicator In particular, SRS resources configured in the SRS resource set associated with the higher layer parameter 'usage' may be indicated by the SRS resource indicator field. In addition, 'spatialRelationInfo' may be configured for each SRS resource, and the value may be one of {CRI, SSB, SRI}.

In addition, the UE transmits uplink data to the base station on the PUSCH (S1603). When the UE detects a PDCCH including DCI format 0_0 or 0_1, it transmits the corresponding PUSCH according to an indication by the corresponding DCI. For PUSCH transmission, two transmission schemes are supported: codebook-based transmission and non-codebook-based transmission.

In the case of codebook-based transmission, when a higher layer parameter 'txConfig' is set to 'codebook', the UE is configured with codebook-based transmission. On the other hand, when the higher layer parameter 'txConfig' is set to 'nonCodebook', the UE is configured with non-codebook based transmission. When the higher layer parameter 'txConfig' is not configured, the UE does not expect to be scheduled by DCI format 0_1. When PUSCH is scheduled by DCI format 0_0, PUSCH transmission is based on a single antenna port. In the case of codebook-based transmission, the PUSCH may be scheduled in DCI format 0_0, DCI format 0_1, or semi-statically. When this PUSCH is scheduled by DCI format 0_1, as given by the SRS resource indicator field and the Precoding information and number of layers field, the UE determines the PUSCH transmission precoder from DCI based on SRI, Transmit Precoding Matrix Indicator (TPMI), and transmission rank. The TPMI is used to indicate the precoder to be applied across the antenna port, and corresponds to the SRS resource selected by the SRI when multiple SRS resources are configured. A transmission precoder is selected from the uplink codebook having the same number of antenna ports as the higher layer parameter 'nrofSRS-Ports'. When the higher layer in which the UE is set to 'codebook' is configured to the parameter 'txConfig', the UE is configured with at least one SRS resource. The SRI indicated in slot n is associated with the most recent transmission of the SRS resource identified by the SRI, where the SRS resource precedes the PDCCH (i.e. slot n) carrying the SRI.

In the case of non-codebook-based transmission, the PUSCH may be scheduled in DCI format 0_0, DCI format 0_1, or semi-statically. When multiple SRS resources are configured, the UE may determine the PUSCH precoder and the transmission rank based on the wideband SRI, where the SRI is given by the SRS resource indicator in the DCI or is given by the higher layer parameter 'srs-ResourceIndicator'. The UE may use one or multiple SRS resources for SRS transmission, where the number of SRS resources may be configured for simultaneous transmission within the same RB based on UE capabilities. Only one SRS port is configured for each SRS resource. Only one SRS resource may be configured as the higher layer parameter 'usage' set to 'nonCodebook'. The maximum number of SRS resources that can be configured for non-codebook-based uplink transmission is 4. The SRI indicated in slot n is associated with the most recent transmission of the SRS resource identified by the SRI, where the SRS transmission precedes the PDCCH (i.e., slot n) carrying the SRI.

The above descriptions (e.g., 3GPP system, beam management, CSI-related operation, DL and UL transmission/ reception operation, etc.) may be applied/used in combination with the method and/or embodiments proposed in the present disclosure, or may be supplemented to clarify the technical characteristics of the methods proposed in the present disclosure. In the present disclosure, '/' may mean including (and) all of the content separated by/or including (or) only a part of the content separated by /.

In addition, the base station described in the present disclosure may mean a generic term for an object that performs transmission and reception of data with the UE. For example, the base station described in the present disclosure may be a concept including one or more Transmission Points (TPs), one or more Transmission and Reception Points (TRPs), and the like. For example, multiple TPs and/or multiple TRPs described in the present disclosure may be included in one base station or included in a plurality of the base stations. In addition, the TP and/or TRP may include a panel of the base station, a transmission and reception unit, and the like.

In addition, the TRP described in the present disclosure may mean an antenna array having one or more antenna elements available in a network located at a specific geographic location in a specific area. The TRP may be understood/applied by being replaced by a base station, a transmission point (TP), a cell (e.g., macro cell/small cell/pico cell, etc.), an antenna array, or a panel, etc.

In addition, the TRP/panel described in the present disclosure may be distinguished based on an index (e.g., CORESETPoolIndex) for distinguishing a CORESET configured/associated for each TRP/panel. For example, a ControlResourceSet information element (IE), which is an upper layer parameter, is used to configure a time/frequency control resource set (CORESET). For example, the control resource set may be related to detection and reception of downlink control information. The ControlResourceSet IE may include a CORESET-related ID (e.g., controlResourceSetID), an index of the CORESET pool for CORESET (e.g., CORESETPoolIndex), time/frequency resource configuration of CORESET, TCI information related to the CORESET, and the like. As an example, the index of the CORESET pool (e.g., CORESETPoolIndex) may be configured to 0 or 1.

As described above, due to the widespread use of image-based data and Internet-of-things (IoT) devices, the amount of transmission and reception data is greatly increasing, and the number of wireless communication devices is also rapidly increasing. Accordingly, the need for a new mobile communication system capable of increasing frequency spectrum efficiency and channel capacity per unit area is emerging. To this end, massive multiple-input multiple-output (MIMO) technology may be used inevitably in 5G new radio (NR) and subsequent wireless access systems, and high-frequency bands including millimeter wave bands may be combined and used. In such an environment, a method for performing very precise beam forming and beam management is required.

In the case of current MIMO transceivers, most of the antenna shapes based on a uniform rectangular array (URA) are used. The URA has a two-dimensional shape in which a uniform linear array (ULA) is repeatedly stacked. Since the URA or ULA can form a beam only for an angular size within a specific range, distortion of the beam occurs if it is out of the corresponding range. Also, in the case of a uniform circular array (UCA), continuous beamforming may be possible for all ranges of azimuth angles, but the range of transmittable zenith angles is still limited.

It is desirable that the transceiver of the next-generation communication system be designed so that stable and continuous beamforming is possible for devices that exist at various locations in a three-dimensional space and have mobility. For example, devices may exist in various locations, such as a small air vehicle with a wide zenith angle, a UE moving vertically in a high-rise building, an object receiving a signal from an indoor ceiling-type base station, and the like. An antenna array capable of performing high-quality beamforming for these devices may preferably have a three-dimensional shape, and in particular, continuous coverage for the entire space may be provided by using a spherical-based array.

The present disclosure proposes a method of constructing a uniform spherical array (USA) through geodesic division of a regular polyhedron and a beamforming method using the same. 3D beamforming with high spectral efficiency may be possible in various user locations and transmission/reception environments through the uniform spherical array proposed in the present disclosure. In other words, it is possible to form the transmission beam according to not only the azimuth, which is the angle to the horizontal location of the target device (user device) to be transmitted, but also the zenith angle, which is the angle to the vertical location based on the uniform spherical array proposed in the present disclosure.

In addition, the present disclosure proposes a configuration method of a 3D codebook for efficiently forming a beam in all directions in a situation where feedback is limited for the exchange of channel state information (CSI) between transmission and reception devices, and describes a beamforming method based on the proposed codebook.

In addition, a detailed signaling method for improving beamforming performance is described, and performance evaluation results for the method proposed in the present disclosure are presented.

Uniform Spherical Array Using Geodesic Division and Beamformer Using the Same

A geodesic polyhedron may be generated by dividing a face constituting a regular polyhedron (e.g., tetrahedron, cube, octahedron, dodecahedron, icosahedron) into n^2 equal equilateral triangles according to the division number (or division order) n, and by orthogonally projecting a division point newly created by the division from the center of the regular polyhedron onto the circumscribed sphere of the regular polyhedron. For example, if a cube A is divided by the number of divisions n, the total number of faces is $A \times n^2$, the total number of sides is $(3A \times n^2)/2$, and the total number of vertices is $$\frac{A \times n^2}{2} + 2.$$

As the number of divisions increases, the shape may be more spherical.

A general geodesic polyhedron is generated by equally dividing the line segments constituting the sides of a regular polyhedron. In this case, the distance between adjacent vertices of the geodesic polyhedron in which the division points are projected orthogonally onto the circumscribed sphere is not constant, and this non-uniformity increases as the number of divisions increases. Therefore, in the case of a transmitter using a non-uniform geodesic array, the beam shape changes depending on the transmission direction, so that it is difficult to perform beamforming of uniform quality/shape in all directions.

For the uniformity of the beam shape, a method of adjusting the location of the vertex may be considered while utilizing the existing geodesic division. Specifically, a geodesic polyhedron may be generated by equally dividing an angle formed between each side and a center point (i.e., origin) of the polyhedron, instead of the conventional method of equally dividing the length of each side of the regular polyhedron. By equally dividing the angle, the distance between the vertices of the geodesic polyhedron on which the dividing points are orthogonally projected may be made constant. Through this, it is possible to increase the uniformity of the spherical array and maintain a uniform beam shape.

For convenience of explanation in the following description, the antenna array based on geodesic polyhedron generated by equally dividing an angle between each side and the center point of the polyhedron is referred to as a uniform spherical array (USA). The uniform spherical array (USA) may be generated by disposing an antenna at the center of a face or vertex of a geodesic polyhedron. The disposed antenna may be configured as a sub-array in the form of a single element or a panel. In other words, the uniform spherical array may include a plurality of antenna elements corresponding to the vertices or centers of the faces of the geodesic polyhedron, and each antenna element corresponding to each vertex or the center of the face may be configured as a panel/sub-array including a single element or a plurality of antenna elements.

FIG. 17 is an example of a geodesic polyhedron generated by dividing an icosahedron. Referring to FIG. 17, a geodesic polyhedron may be generated by dividing the icosahedron by the above-described manner, that is, by equally dividing the angle formed by each side and the center point of the polyhedron. FIG. 17(a) shows an example in the case where the number of divisions n=1, FIG. 17(b) shows an example in the case where the number of divisions n=2, FIG. 17(c) shows an example in the case where the number of divisions n=3, and FIG. 17(d) shows an example in the case where the number of divisions n=4.

A point indicated in FIG. 17 illustrates an antenna element or an antenna panel/sub-array disposed at a vertex. For example, when antenna elements are disposed at vertices, the number of antenna elements M for the number of divisions n=1, 2, 3, and 4 may be expressed as M=12, 42, 92, and 162, respectively. Each antenna element may be configured as a single element or as the form of a panel/sub-array.

The value (e.g., number of divisions n/number of antenna elements M) may be indicated/configured by the base station to the UE by higher layer signaling (e.g., RRC/MAC CE) or dynamic signaling (e.g. DCI). Alternatively, the UE may request or recommend a preferred value(s) (based on UE capability) to the base station.

For convenience of explanation, the shape of the hemisphere will be mainly described in the uniform spherical array based on the above-described geodesic polyhedron. Also, it is assumed that the uniform spherical array is composed of M antenna elements. On the hemisphere, except for the poles, M/2−1 antenna element may exist. The location of each antenna element on the sphere may be expressed using a polar coordinate system. That is, the location of each antenna element on the spherical surface may be expressed by the zenith angle $\theta_m$ and the azimuth angle $\phi_m$. Antenna elements in which the zenith angle is the same and the azimuth angle maintains a constant interval (or period) may be configured as one group.

For example, if one group is generated with 5 antenna elements, the number of antenna groups existing on the hemisphere becomes P=(M/2−1)/5. Five antenna elements in each antenna group have the same zenith angle, and the azimuth has a characteristic of increasing/decreasing by $2\pi/5$ starting from a specific value (i.e. the azimuth angle of a specific antenna element). For example, the number of antenna groups for the division number n=1, 2, 3, 4 may be determined as P=1, 4, 9, and 16, respectively in the above-described example of the icosahedron.

In addition, the zenith angle $\theta'_p$ and the starting point of the azimuth angle $\phi'_p$ of for the p-th group (p=0, 1, . . . , P−1) may be expressed as Table 11.

Table 11 shows the antenna location parameters (unit: degree) of the geodesic array according to the number of divisions (n).

TABLE 11

| n = 1 | | n = 2 | | n = 3 | | n = 4 | |
|---|---|---|---|---|---|---|---|
| p $\theta'_p$ | $\phi'_p$ | p $\theta'_p$ | $\phi'_p$ | p $\theta'_p$ | $\phi'_p$ | p $\theta'_p$ | $\phi'_p$ |
| 0 63.43 | 0.00 | 0 31.72 | 0.00 | 0 21.14 | 0.00 | 0 15.86 | 0.00 |
| — | | 1 58.28 | 36.00 | 1 37.38 | 36.00 | 1 26.57 | 36.00 |
| | | 2 63.43 | 0.00 | 2 42.29 | 0.00 | 2 31.72 | 0.00 |
| | | 3 90.00 | 18.00 | 3 58.88 | 23.62 | 3 43.65 | 22.39 |
| | | | — | 4 58.88 | 48.38 | 4 43.65 | 49.61 |
| | | | | 5 63.43 | 0.00 | 5 47.58 | 0.00 |
| | | | | 6 79.19 | 36.00 | 6 58.28 | 36.00 |
| | | | | 7 81.02 | 12.40 | 7 59.62 | 17.53 |
| | | | | 8 81.02 | 59.60 | 8 59.62 | 54.47 |
| | | | | | — | 9 63.43 | 0.00 |
| | | | | | | 10 73.95 | 26.27 |
| | | | | | | 11 73.95 | 45.73 |
| | | | | | | 12 76.56 | 9.51 |
| | | | | | | 13 76.56 | 62.49 |
| | | | | | | 14 90.00 | 18.00 |
| | | | | | | 15 90.00 | 36.00 |

Using parameters ($\theta'_p$, $\phi'_p$) the spherical coordinate values ($\theta_m, \phi_m$) of the m-th antenna element Am present in the uniform spherical array may be represented as Equations 3 and 4.

Equation 3 represents the zenith angle of the antenna element Am.

$$\theta_m = \begin{cases} 0, & m = 0 \\ \theta'_{\lfloor(m-1)/5\rfloor}, & 1 \le m \le 5P \\ \pi - \theta_{M-m-1}, & m > 5P \end{cases} \quad [\text{Equation 3}]$$

Equation 4 represents the azimuth of the antenna element Am.

$$\phi_m = \begin{cases} 0, & m = 0 \\ \phi'_{\lfloor(m-1)/5\rfloor} + (2\pi/5) \times (m \bmod 5), & 1 \le m \le 5P \\ \pi/5 + \phi_{M-m-1}, & m > 5P \end{cases} \quad [\text{Equation 4}]$$

In Equations 3 and 4, $\lfloor \; \rfloor$ means an integer less than or equal to. Also, m=0 is the index of the antenna element at the pole, and 1≤m≤5P, that is, $$1 \le m \le \left(\frac{M}{2}\right) - 1,$$

is an index of an antenna element belonging to the p=⌊(m−1)/5⌋th group on the hemisphere. Also, m>5P means an index of an antenna element present in the rest of the hemisphere.

When an antenna port (or element) is arranged/configured using Equations 3 and 4, there is an advantage in that a codebook design, which will be described later, becomes easy.

As described above, a beam may be formed in a specific direction by using a uniform spherical array, and a corresponding beamformer may be expressed by utilizing the path difference from each antenna element to the target UE.

The direction/location of the target UE may be expressed as zenith angles and azimuth angles ($\square$, $\square$) using spherical coordinates (i.e. polar coordinate system). Based on the distance from the origin, which is the center of the uniform spherical array (i.e. the center of the geodesic polyhedron) to the UE, the relative path difference between the m-th antenna and the UE may be expressed as in Equation 5.

$$d_m(\Theta,\Phi) = -R(\sin\Theta \sin\theta_m \cos(\Phi-\phi_m) + \cos\Theta \cos\theta_m) \quad \text{[Equation 5]}$$

Here, R represents a distance between the origin and each antenna, and is a design parameter.

When the wavelength of the carrier frequency is expressed by $\square$, a phase difference of $2\pi\, d_m(\Theta, \Phi)/\lambda$ may occur due to the path difference as in Equation 5. If the beamforming component for compensating for the phase difference of the m-th antenna is configure as $v_m(\Theta, \Phi) = \exp\{-j\, 2\pi\, d_m(\Theta, \Phi)/\lambda\}$, a beamforming vector $v(\Theta, \Phi) = [v_0(\Theta, \Phi)\ v_1(\Theta, \Phi)\ \ldots\ v_{M-1}(\Theta, \Phi)]^T$ for an array composed of M antenna elements $A_0, A_1, \ldots, A_{M-1}$ may be expressed as in Equation 6.

$$v(\Theta, \Phi) = \left[e^{-j\frac{2\pi}{\lambda}d_0(\Theta,\Phi)} e^{-j\frac{2\pi}{\lambda}d_1(\Theta,\Phi)} \ldots e^{-j\frac{2\pi}{\lambda}d_{M-1}(\Theta,\Phi)}\right]^T \quad \text{[Equation 6]}$$

When beamforming of Equation 6 is performed using the geodesic polyhedron-based uniform spherical array shown in FIG. 17, a beam shape of a certain shape may be generated regardless of the target direction, and signal transmission of uniform quality is possible.

FIG. 18 shows an example of mutual interference values for two beam directions randomly distributed on a three-dimensional space using the number of divisions n=1, 2, 3, 4 geodesic arrays. FIGS. 18(a) to 18(d) show mutual interference values when the number of divisions n=1, 2, 3, and 4, respectively. In FIG. 18, it is assumed that each antenna element has an isotropic gain pattern, and the minimum value of the distance between adjacent antennas in each array is configured to be half a wavelength. In addition, when the angle formed by the two beam directions is $\square$, it represents the average of the interference values. FIG. 18 is only an example for helping understanding of the present disclosure, and does not limit the technical scope of the present disclosure.

Referring to FIG. 18, it can be seen that the location of the zero point (null) having a very small value of the magnitude of the interference is constantly maintained. This means that a uniform beam pattern may be obtained regardless of the target direction in beam transmission using a spherical array, and it is possible to design an efficient multi-beam transmission/reception scheme by utilizing this property.

Codebook Configuration for Spherical Arrays

The codebook is composed of a set of beamforming codevectors for transmitting a beam in a specific direction. The codevector constituting the codebook should be able to represent the area in space for beam transmission, and it is preferable that the magnitude of mutual interference is small when a plurality of codevectors are simultaneously transmitted by having low correlation between codevectors. Hereinafter, a method of constructing a codebook for a uniform spherical array according to the above-described proposed method will be described in detail.

One of the efficient methods of constructing a codebook covering a three-dimensional space is to generate a transmit beamforming vector in the direction of each antenna element from the center of a sphere and configure each of them as a codevector. When the codevectors are generated in this way, a codebook for a spherical array including a total M of antenna elements may be composed of M codevectors.

Equation 7 represents the codevector $v_m$ in the direction of the m-th antenna. The codevector $v_m$ of Equation 7 may be calculated by substituting the coordinates ($\square_m$, $\square_m$) obtained by Equation 3, Equation 4 and Table 11 with the relation of $\Theta=\theta_m$, $\Phi=\phi_m$ for the beamformer generation equations in Equations 5 and 6.

[Equation 7]

$$v_m = v(\theta_m, \phi_m)$$
$$= \left[e^{-j\frac{2\pi}{\lambda}d_0(\theta_m,\phi_m)} e^{-j\frac{2\pi}{\lambda}d_1(\theta_m,\phi_m)} \ldots e^{-j\frac{2\pi}{\lambda}d_{M-1}(\theta_m,\phi_m)}\right]^T,$$
$$m = 0, 1, \ldots, M-1$$

Equation 7 is expressed in an inverse discrete fourier transform (IDFT) format, but it may also be expressed in a DFT format. If the codevector $v_m$ in the direction of the m-th antenna is expressed in the DFT format, it may be expressed as in Equation 8.

[Equation 8]

$$v_m = v(\theta_m, \phi_m)$$
$$= \left[e^{j\frac{2\pi}{\lambda}d_0(\theta_m,\phi_m)} e^{j\frac{2\pi}{\lambda}d_1(\theta_m,\phi_m)} \ldots e^{j\frac{2\pi}{\lambda}d_{M-1}(\theta_m,\phi_m)}\right]^T,$$
$$m = 0, 1, \ldots, M-1$$

The codebook matrix V having codevectors for M directions as column vectors may be expressed as in Equation 9.

$$V = [v_0\ v_1\ \ldots\ v_{M-1}] \quad \text{[Equation 9]}$$
$$= \begin{bmatrix} v_{0,0} & \cdots & v_{M-1,0} \\ \vdots & \ddots & \vdots \\ v_{0,M-1} & \cdots & v_{M-1,M-1} \end{bmatrix}$$

In Equation 9, the (m, k)th component $v_{m,k}$ of V is $$e^{-j\frac{2\pi}{\lambda}d_k(\theta_m,\phi_m)},$$

which is a phase compensation value applied to the kth antenna in the codevector that generates the beam in the direction of the m-th antenna (m=0, 1, . . . , M−1, k=0, 1, . . . , M−1).

When the codebook defined as described above is used, a beam may be generated in the direction from the origin (i.e., the center of a uniform spherical array) to each antenna.

FIG. 19 shows an example of a direction of some beams with respect to an icosahedron-based geodesic array with a division number n=3 having M=92 antennas to which a method proposed in the present disclosure can be applied. FIG. 19 is only an example for convenience of description, and does not limit the technical scope of the present disclosure.

When a large value such as 92 is used for the value of M, the above-described codebook configuration method can facilitate performance expansion by covering the azimuth/zenith angle uniformly with 92. However, when the value of M is small (e.g., 12), it is a high possibility that the performance is deteriorated due to the need to cover with 12 codewords, resulting in poor granularity. In order to improve this performance degradation, even if the value of M is configured as a specific value, the values of $(\theta_m, \phi_m)$ in Equations 3 and 4 used in the codebook may promise to use a value (e.g. M') configured by the base station or to use a specific value (e.g. M') greater than or equal to M. M' may be greater than or equal to M. For example, even when M is 12, the base station may be predefined to configure M' as 92 or use 92. This may have the effect of oversampling which has the effect of improving the granularity of the beam used.

In this case, the final codebook may be expressed as Equation 10. In Equation 10, M' may be greater than or equal to M.

$$V = [v_0 \; v_1 \; \ldots \; v_{M'-1}] \quad \text{[Equation 10]}$$
$$= \begin{bmatrix} v_{0,0} & \cdots & v_{M'-1,0} \\ \vdots & \ddots & \vdots \\ v_{0,M-1} & \cdots & v_{M'-1,M-1} \end{bmatrix}$$

Array Parameter Determination Method for Efficient Use of Codebook

The codebook defined in Equation 7 (or Equation 8) and Equation 9 may generate a beam in an omnidirectional direction, and minimize the degree of interference between codevectors by determining the size of the spherical array to an appropriate value. In the case of the geodesic spherical array proposed in the present disclosure, since the spacing between adjacent antennas is constant characteristic, and thus the beam shape is also maintained constant regardless of the direction, the distribution of interference magnitudes between codevectors has a constant characteristic. In addition, in order to minimize interference between codevectors, the distance between adjacent antennas may be adjusted.

FIG. 20 shows an example of an average value of interference magnitudes between adjacent codevectors according to a change in a distance between antennas. FIG. 20 is only an example for helping understanding of the present disclosure, and does not limit the technical scope of the present disclosure. In FIG. 20, a symbol □ displayed on the x-axis indicates a value obtained by normalizing a straight-line distance between adjacent antennas to a wavelength value. For example, when □=0.5, the distance between adjacent antennas becomes half a wavelength. The y-axis represents a value obtained by normalizing the interference magnitude between adjacent codevectors. For example, 0 dB means that the two codevectors are the same, and −20 dB means that the correlation between the two codevectors is reduced to 1/100.

Referring to (a) of FIG. 20, in the case of division number n=1, it can be seen that a zero point at which interference is minimized occurs at □=0.505. Referring to (b) of FIG. 20, in the case of division number n=2, it can be seen that the zero point at which the interference is minimized occurs at □=0.442, 0.5. Referring to (c) of FIG. 20, in the case of division number n=3, it can be seen that the zero point at which the interference is minimized occurs at □=0.433, 0.454, 0.5, and referring to (d) of FIG. 20, in the case of division number n=4, it can be seen that the zero point at which the interference is minimized occurs at □=0.441, 0.483, 0.5.

That is, efficient multi-rank beamforming is possible by adjusting the size of the array and designing the distance between adjacent antennas to have a corresponding value. In addition, since a zero point occurs at a value of □=0.5 regardless of the number of divisions, efficient use of the proposed codebook is possible when the size of the array is configured so that the distance between adjacent antennas is half a wavelength. Meanwhile, since it is not easy to physically change the size of the antenna array, the base station may change and use the center frequency so that the designed k value is used as 0.5. Alternatively, an offset (e.g., lambda/2) may be reported to the phase of the constituting codebook, and this may be corrected. For example, the correction value may be configured by the base station in the UE or a predefined value may be used.

Meanwhile, in the case of using Equation 10, since orthogonality of all columns is not maintained by oversampling, column vectors constituting the codebook may not be orthogonal to each other. For this, it may be promised in advance to use M instead of M' in multi-rank transmission.

FIG. 21 shows an example of a sum-rate when performing multi-rank transmission using a spherical array and a codebook proposed in the present disclosure. It is assumed that each antenna has an isotropic gain pattern. FIG. 21 is only an example for helping understanding of the present disclosure, and does not limit the technical scope of the present disclosure.

In FIG. 21, after randomly distributing the number of UEs equal to the rank size indicated on the x-axis in a three-dimensional space, the sum-rate is calculated by calculating the signal-to-interference ratio for each target direction, and the average value obtained by performing a simulation that repeats this multiple times is plotted on the y-axis. In addition, the curve marked 'Unquantized' is the performance when beamforming is performed in the correct target direction using Equation 6, and the curve indicated by 'Codevector' is the transmission performance obtained when beamforming is performed using the codevectors defined by Equation 7 (or Equation 8) and Equation 9.

Referring to FIG. 21, compared to the 'Unquantzed' method that utilizes accurate channel state information (CSI), it can be seen that the performance decrease of the codebook transmission method using the selected codevector closest to the target direction occurs within approximately 10%. Specifically, the degree of performance attenuation for the number of divisions n=1, 2, 3, 4 arrays when transmitting M/2 rank, which is half of the maximum rank, is observed to be 1, 8.5, 10, and 11%, respectively.

Therefore, it can be seen that even when the codebook proposed in the present disclosure is applied to a spherical array, transmission performance similar to that when using accurate channel information is shown. Also, referring to FIG. 21, it can be observed that when the rank is changed from a minimum of 2 to a maximum of M, the signal-to-interference ratio for each rank decreases, but the sum-rate continuously increases. Therefore, it can be seen that it is possible to simultaneously transmit data streams corresponding to the number of antenna elements using the spherical array.

FIG. 22 shows an example of a gain pattern when the gain pattern for each antenna is isotropic and when the 3 dB beamwidth is 65 degrees. FIG. 22 is only an example for helping understanding of the present disclosure, and does not limit the technical scope of the present disclosure. In the case of an antenna that is actually used, it has a gain pattern of limited beamwidth, not isotropic. Referring to FIG. 22, as the beamwidth decreases, the beamforming gain decreases and, at the same time, the inter-beam interference decreases. As a result of applying 3 dB beamwidths to 65, 95, 125, and 155 degrees for the spherical array proposed in the present disclosure, the sum-rate is maximized at 155 degrees beamwidth, and in this case, it can be seen that the performance is maximized when the antennas participating in beamforming for each transmission direction are limited to half of the total number of antennas.

FIG. 23 shows an example of sum-rate performance when a 155 degree beamwidth is applied and the number of antennas used for each rank is limited to half for a geodesic array with a division number n=3. FIG. 23 is only an example for helping understanding of the present disclosure, and does not limit the technical scope of the present disclosure.

Even in the case of FIG. 23, the codebook application performance tends to be very similar to the performance when using accurate channel information (e.g., 'Unquantized' in FIG. 23). In addition, it can be seen that the performance when the spacing between adjacent antennas is configured as a half-wavelength ($\square$=0.5) shows substantially the same performance as when the optimal performance is evaluated for various spacing sizes through fine tuning (e.g. $\square$ optimal). Therefore, as described above, beamforming using a codebook using a geodesic spherical array in which the distance between adjacent antennas is configured as a half wavelength may be a very efficient multi-rank transmission scheme.

Signaling and Beamforming Accuracy Improvement Method Using Codebook Index

In order to form a beam with the highest signal-to-noise ratio (SNR) in a specific direction, maximum ratio transmission (MRT) using a beamforming vector matching the corresponding channel may be performed. In the MRT, a signal may be transmitted according to the strongest eigenmode, and a received signal may be combined using maximum ratio combining.

A channel when forming a beam for a total of K UEs by utilizing a transmit antenna array may be represented by a K×M matrix as in Equation 11.

$$H = \begin{bmatrix} h_1 \\ h_2 \\ \vdots \\ h_K \end{bmatrix} = \begin{bmatrix} h_{1,0} & h_{1,1} & \cdots & h_{1,M-1} \\ h_{2,0} & h_{2,1} & \cdots & h_{2,M-1} \\ \vdots & \vdots & \ddots & \vdots \\ h_{K,0} & h_{K,1} & \cdots & h_{K,M-1} \end{bmatrix}$$ [Equation 11]

Here, the row vector $h_k=[h_{k,0}\ h_{k,1}\ \ldots\ h_{k,M-1}]$ denotes a channel from the spherical antenna array to the k-th UE (k=1, 2, . . . , K).

An MRT beamforming matrix may be generated as a conjugated complex matrix of H. Equation 12 represents the MRT beamforming matrix generated with the conjugated complex matrix of H.

$$W_{MRT}=H^H=[h_1{}^H h_2{}^H \ldots h_K{}^H]$$ [Equation 12]

The MRT beamforming matrix as in Equation 12 may be generated when accurate channel information is known, and when a codebook index is fed back to a transmission device (e.g., a base station) instead of accurate channel information, a beamforming vector for the k-th UE may be selected as a code vector having the greatest correlation with an actual channel.

Equation 13 represents the beamforming vector for the k-th UE.

$$w_k=v_{q(k)}, q(k)=\mathrm{argmax}_{0\leq i<M}|h_k v_i|^2.$$ [Equation 13]

The approximated MRT beamforming matrix may be determined as in Equation 14.

$$\tilde{W}_{MRT}=[w_1 w_2 \ldots w_K]$$ [Equation 14]

When performing the MRT, a signal-to-interference ratio (SIR) may increase due to mutual interference between beams, and thus a problem may occur in which the sum-rate decreases. When zero-forcing (ZF) transmission is performed to remove the interference between beams, the beamforming matrix may be configured as shown in Equation 15.

$$W_{ZF}=H^H(HH^H)^{-1}$$ [Equation 15]

When the codebook index is used instead of accurate channel information, the approximated channel may be expressed as in Equation 16.

$$\tilde{H}=[w_1 w_2 \ldots w_K]^H$$ [Equation 16]

For the approximated channel as in Equation 16, the ZF beamforming matrix may be expressed as Equation 17, and data may be transmitted using it.

$$\tilde{W}_{ZF}=\tilde{H}^H(\tilde{H}\tilde{H}^H)^{-1}$$ [Equation 17]

FIG. 24 is an example illustrating multi-rank transmission performance using MRT and ZF beamforming for four geodesic arrays having different antenna numbers. FIG. 24 is only an example for helping understanding of the present disclosure, and does not limit the technical scope of the present disclosure. In FIG. 24, the x-axis represents a normalized rank value obtained by dividing the number of simultaneously transmitted data beams, that is, the rank by the number of array antennas M, and the y-axis is a normalized sum rate value obtained by dividing the sum rate by the number of antennas M, and represents the amount of transmittable data per unit antenna as the transmission rank increases to the maximum rank.

FIG. 24 shows the result of calculating the average sum-rate by generates a channel of Equation 11 according to the difference in distance from each antenna to the UE assuming a line-of-sight (LoS) channel for K UEs generated at arbitrary locations in 3D space, and repeating the channel generation process. In addition, the antenna beam width is applied to 155 degrees, and it is assumed that an environment in which noise power of 0.01 times the power transmitted from one antenna element exists in the receiving UE (i.e., SNR=20 dB). FIG. 24 shows transmission performance using Equations 12 and 15, which are beamforming equations corresponding to a case in which accurate channel information is known, and it can be seen that ZF beamforming exhibits excellent sum-rate performance, which is increased 4 times or more compared to MRT beamforming.

FIG. 25 is an example illustrating multi-rank transmission performance using ZF beamforming and ZF beamforming when using a codebook index for four geodesic arrays having different numbers of antennas. FIG. 25 is only an example for helping understanding of the present disclosure, and does not limit the technical scope of the present disclosure. In FIG. 25, as shown in FIG. 24, the x-axis represents the number of data beams that are simultaneously transmitted, and the y-axis represents the normalized sum-rate value obtained by dividing the sum-rate by the number of antennas M. Referring to FIG. 25, when the codebook index is used, the ZF and the MRT of FIG. 24 show similar performance.

In an actual communication environment, a feedback channel may be limited, and thus beamforming performance may generally decrease. Hereinafter, a method for improving beamforming performance through additional signaling (or additional feedback) in a feedback operation based on the codebook index is proposed.

FIG. 26 shows an example of a signaling operation sequence between a UE and a base station to which a method and/or an embodiment for improving beamforming performance in consideration of an environment in which a feedback channel is limited can be applied.

The base station may transmit M codevectors to the UE (S2610). Alternatively, instead of transmitting the M codevectors, a CSI-RS configured with M ports (non-precoding) may be transmitted. The M codevectors may be determined based on Equation 7 (or Equation 8) and Equation 9 described above. The M codevectors may be transmitted through a transmission resource (e.g., a CSI-RS resource). For example, the transmission resource may be a time resource, a frequency resource, or a time and frequency resource.

The UE may perform measurement based on the M codevectors (S2620), and may feed back the measurement result to the base station (S2630). For example, the UE may measure the received power (e.g., RSRP/RSRQ) of M codevectors, and feedback the index of the codevector having the greatest received power to the base station. For example, the index may be a precoding matrix indicator (PMI). The measurement may be based on a correlation between the codevector $v_m$ and the channel $h_k$.

In addition, the UE may additionally transmit the indexes of the codevector corresponding to the index (i.e., the index of the codevector having the largest received power) to be fed back and L adjacent codevectors. For example, when the number of adjacent codevectors is configured as L=2, the locations of three codevectors involved in the feedback of the UE form a triangle on the surface of the geodesic array.

In addition to the index (e.g., PMI), the UE measuring the received power may additionally feedback a channel quality index (e.g., channel quality indicator, CQI) corresponding to the quantization level. For example, by selecting a codevector having the largest received power and L adjacent codevectors, (i) an index corresponding to each codevector and (ii) a relative received power difference value between the codevectors may be quantized to provide additional feedback.

For example, when the number of bits for reporting the magnitude of the relative received power is b, the number of quantization levels becomes $2^b$. When the number of quantization levels of the relative received power per codevector is $2^b$, there are $2^b \times 2^b$ detailed areas in the triangle, so that beamforming vectors representing these areas may be used for transmission.

The base station may fine-tune the beamforming direction by utilizing the relative received power between the reported (L+1) adjacent codevectors (S2640). In addition, the base station may transmit data to the UE based on the fine-tuned beamforming direction.

As described with reference to FIG. 26, the fine-tuned beamforming may be performed by additionally feeding back the channel quality index (e.g. CQI). Such a signaling process can be appropriately modified and used depending on the operating environment. For example, a separate transmission process of the codevector having the largest received power and the adjacent codevectors may be omitted if necessary.

FIG. 27 is an example illustrating improved transmission performance when additional signaling is performed using parameters L=2, the number of adjacent codevectors, and b=2, the number of quantization levels for a geodesic array with a division number n=3. FIG. 27 is only an example for helping understanding of the present disclosure, and does not limit the technical scope of the present disclosure.

Referring to FIG. 27, the conventional method of feeding back only the index of the representative codevector is represented as 'codevector index feedback', and the performance improvement method of feedback by additionally using a total of B=2+2 bits for reporting the relative power value is represented as 'enhanced index feedback'. In addition, the transmission performance is changed according to the noise level of the UE, and when the received noise power SNR=20, 10, 0 dB compared to the used power per unit antenna element, each sum-rate is compared and illustrated.

Referring to FIG. 27, it can be seen that the transmission performance of the enhanced index feedback is improved compared to the codevector index feedback method. Accordingly, by additionally feeding back the channel quality index (e.g., CQI) in addition to feeding back the codevector index, it is possible to improve the transmission performance based on the geodesic spherical array.

According to the method and/or embodiment proposed in the present disclosure described above, a three-dimensional spherical antenna array is possible, and beamforming may be performed on a three-dimensionally shaped antenna array. That is, it enables beamforming with accurate and stable performance in all directions. In addition, the codebook generation method considering the three-dimensionally shaped antenna array enables transmission with stable performance in all directions in 3D space by overcoming the limitations of the prior art. In addition, since the antenna array design method according to the embodiment of the present disclosure allows a variable number of antenna elements to be used, an array suitable for a target beam width and interference power size can be selected. In particular, when a high-frequency band such as a millimeter wave band to be utilized in next-generation mobile communication is used, a more compact and densely-shaped array can perform accurate beamforming.

Hereinafter, a method for reporting channel state information in a wireless communication system and a device therefor will be described in detail with reference to FIGS. 28 to 29 based on the above-described method and/or embodiments.

FIG. 28 shows an example of an operation flowchart for performing CSI reporting by a user equipment (UE) to which the methods proposed in the present disclosure can be applied. FIG. 28 is only for convenience of description, and does not limit the scope of the present disclosure. In addition, some step(s) shown in FIG. 28 may be omitted depending on circumstances and/or settings. In addition, for the operation of the UE to perform CSI reporting, the CSI-related operation contents of FIG. 14 and the related description described above may be referenced/used.

In the following description, it will be described with reference to "antenna array", but as described above, the term "antenna array" may be replaced with and applied to expressions such as a panel and a cell (e.g., macro cell/small cell/pico cell, etc.), a transmission point (TP), a transmission reception point (TRP), a base station (gNB, etc.).

The UE may perform reception and transmission operations to be described below based on the three-dimensionally shaped antenna array configured by disposing a plurality of antenna elements in three dimensions. The antenna array may include a plurality of antenna elements.

According to an embodiment, the antenna array has a three-dimensional shape having omnidirectional symmetry. The omnidirectional symmetry means that a shape (e.g. a pentagon) when viewed from one direction is the same as a shape when viewed from the other direction (opposite direction), and this characteristic is the same in any direction. Taking an icosahedron as an example, the shape when viewed from one direction is a pentagon, and the shape viewed from the opposite direction is also a pentagon. The icosahedron has omnidirectional symmetry as its shape is the same as a pentagon when viewed from any direction. Another example of the three-dimensional shape having the omnidirectional symmetry may be a sphere or a dodecahedron. However, the present disclosure is not limited thereto, and the three-dimensional shape having omnidirectional symmetry may include all three-dimensional shapes that appear to have the same shape (e.g. a circle, a pentagon, a triangle, etc.) when viewed from any direction.

For example, the three-dimensional shape of the antenna array may be a three-dimensional spherical shape formed based on a geodesic polyhedron. (The three-dimensional sphere shape may be a concept including a shape similar to a sphere.) Each antenna element of the plurality of antenna elements may be disposed at a position corresponding to a dividing point generated by equally dividing an angle between one side of a regular polyhedron constituting the geodesic polyhedron and a center of the regular polyhedron. Through this, the distance between respective antenna elements may be constantly maintained. For example, a distance between a first antenna element and a second antenna element may be a wavelength/2 according to a carrier frequency through which the reference signal is transmitted.

The location of the UE may be expressed based on a three-dimensional spherical coordinate system or a polar coordinate system. That is, the location of the UE may be indicated by the zenith angle and the azimuth angle.

Although not shown in FIG. 28, the UE may receive information on the number of divisions for configuring the geodesic polyhedron from the base station. The configuration of the geodesic polyhedron may be determined based on the information on the number of divisions, and the UE may perform CSI reporting based on a codebook corresponding to the shape.

The UE may receive a CSI-related reference signal (S2810). For example, the CSI-related reference signal may be a CSI-RS. The reference signal may be received through a time resource, a frequency resource, or a time and frequency resource. For example, the CSI-related reference signal may include information on codevectors. The information on the codevectors may include a set of codevectors corresponding to each antenna element of an antenna array disposed in a three-dimensional shape formed based on a geodesic polyhedron.

For example, the operation of receiving the CSI-related reference signal by the UE (100/200 in FIGS. 30 to 35) of step S2810 described above may be implemented by the device of FIGS. 30 to 35 to be described below. For example, referring to FIG. 31, one or more processors 102 may control one or more transceivers 106 and/or one or more memories 104, etc. to receive the CSI-related reference signal, and the one or more transceivers 106 may receive the CSI-related reference signal.

The UE may measure CSI based on the reference signal and the codebook (S2820). The measuring the CSI may include measuring received power based on the reference signal.

For example, the codebook may be generated based on a path difference between a distance from an origin, which is a center of the three-dimensional shape, to the UE and a distance from a specific antenna element to the UE.

The path difference may be expressed as the following equation.

$$d_m(\Theta,\Phi) = -R(\sin\Theta \sin\theta_m \cos(\Phi-\phi_m) + \cos\Theta \cos\theta_m) \quad \text{[Equation]}$$

Where, m is an index of the specific antenna element included in the antenna array, $0 \leq m \leq M-1$, $\Theta,\Phi$ is a zenith angle and an azimuth angle of the UE, respectively, $\theta_m,\phi_m$ is the zenith angle and the azimuth angle of the specific antenna element, respectively, and R represents a distance between the origin and each antenna element.

For example, the codebook may be composed of codevectors corresponding to the number of the plurality of antenna elements. Alternatively, the codebook may be composed of the number of codevectors greater than or equal to the number of the plurality of antenna elements, and in this case, may receive information on the number of the codevectors from the base station.

For example, the codevector v constituting the codebook may be expressed as the following equation.

$$\begin{aligned} v_m &= v(\theta_m, \phi_m) \\ &= \left[ e^{-j\frac{2\pi}{\lambda}d_0(\theta_m,\phi_m)} e^{-j\frac{2\pi}{\lambda}d_1(\theta_m,\phi_m)} \ldots e^{-j\frac{2\pi}{\lambda}d_{M-1}(\theta_m,\phi_m)} \right]^T, \\ m &= 0, 1, \ldots, M-1 \end{aligned} \quad \text{[Equation]}$$

Where, M is the number of the plurality of antenna elements, and $\lambda$ is a wavelength according to a carrier frequency through which the CSI-related reference signal is transmitted.

For example, the codevector v constituting the codebook may be expressed by the following equation.

$$\begin{aligned} v_m &= v(\theta_m, \phi_m) \\ &= \left[ e^{j\frac{2\pi}{\lambda}d_0(\theta_m,\phi_m)} e^{j\frac{2\pi}{\lambda}d_1(\theta_m,\phi_m)} \ldots e^{j\frac{2\pi}{\lambda}d_{M-1}(\theta_m,\phi_m)} \right]^T, \\ m &= 0, 1, \ldots, M-1 \end{aligned} \quad \text{[Equation]}$$

Where, M is the number of the plurality of antenna elements, and is a wavelength according to a carrier frequency through which the CSI-related reference signal is transmitted.

For example, the operation of measuring CSI by the UE (100/200 in FIGS. 30 to 35) of step S2820 described above may be implemented by the device of FIGS. 30 to 35 to be described below. For example, referring to FIG. 31, one or more processors 102 may control one or more transceivers 106 and/or one or more memories 104, etc. to measure the CSI.

The UE may report the CSI (S2830). The CSI report may include PMI, CQI, and the like. For example, the CSI report may include information on both a codevector with the best performance among a plurality of codevectors and the adjacent codevector. For example, the reported CSI may include (i) an index of a first codevector corresponding to a maximum received power and (ii) an index of a second codevector and a third codevector adjacent to the first codevector. The number of reported adjacent codevectors may be configured by the base station to the UE or may be reported as many as a predefined number between the base station and the UE. As an example, a plurality of PMIs may be reported.

In addition, it is possible to measure the CQI for each of the codevector with the best performance and the adjacent codevector and report it to the base station. As an example, the reported CSI may further include a channel quality indicator (CQI) corresponding to each of the first codevector, the second codevector, and the third codevector.

For example, the operation of reporting the CSI by the UE (100/200 in FIGS. 30 to 35) of step S2830 described above may be implemented by the device of FIGS. 30 to 35 to be described below. For example, referring to FIG. 31, one or more processors 102 may control one or more transceivers 106 and/or one or more memories 104, etc. to transmit the CSI report, and the one or more transceivers 106 may transmit the CSI report.

FIG. 29 shows an example of an operation flowchart for receiving CSI by a base station (BS) to which the methods proposed in the present disclosure can be applied. FIG. 29 is only for convenience of description, and does not limit the scope of the present disclosure. In addition, some step(s) shown in FIG. 29 may be omitted depending on circumstances and/or settings. In addition, for the operation of the base station to receive CSI report from the UE, the CSI-related operation contents of FIG. 14 and the related description described above may be referenced/used.

As described above, in the following description, it will be described with reference to "antenna array", but the term "antenna array" may be replaced with and applied to expressions such as a panel and a cell (e.g. macro cell/small cell/pico cell, etc.), a transmission point (TP), a transmission reception point (TRP), a base station (gNB, etc.).

The base station may mean a generic term for an object that performs transmission and reception of data with the UE. For example, the base station may be a concept including one or more Transmission Points (TPs), one or more Transmission and Reception Points (TRPs), and the like.

The base station may perform reception and transmission operations to be described below based on the three-dimensionally shaped antenna array configured by disposing a plurality of antenna elements in three dimensions. The antenna array may include a plurality of antenna elements.

According to an embodiment, the antenna array has a three-dimensional shape having omnidirectional symmetry. The omnidirectional symmetry means that a shape (e.g. a pentagon) when viewed from one direction is the same as a shape when viewed from the other direction (opposite direction), and this characteristic is the same in any direction. Each antenna element included in the antenna array may have a constant distance from the center of the three-dimensional shape, and may be disposed in one region of a surface of the three-dimensional shape.

For example, the three-dimensional shape of the antenna array may be a three-dimensional spherical shape formed based on a geodesic polyhedron. (The three-dimensional sphere shape may be a concept including a shape similar to a sphere.) Each antenna element of the plurality of antenna elements may be disposed at a position corresponding to a dividing point generated by equally dividing an angle between one side of a regular polyhedron constituting the geodesic polyhedron and a center of the regular polyhedron. Through this, the distance between respective antenna elements may be constantly maintained. For example, a distance between a first antenna element and a second antenna element may be a wavelength/2 according to a carrier frequency through which the reference signal is transmitted.

The location of the UE communicating with the base station may be expressed based on a three-dimensional spherical coordinate system or a polar coordinate system. That is, the location of the UE may be indicated by the zenith angle and the azimuth angle.

The base station may transmit configuration information to the UE (S2910). For example, the configuration information may include a CSI report-related configuration. For example, the configuration information may include information on the number of divisions to constitute the geodesic polyhedron. The configuration of the geodesic polyhedron may be determined based on the information on the number of divisions, and the UE may perform CSI reporting based on a codebook corresponding to the shape. The configuration information may be transmitted to the UE through higher layer signaling (e.g. RRC or MAC-CE). When the configuration information is pre-configured/transmitted, step S2910 may be omitted.

For example, the operation of transmitting the configuration information by the base station (100/200 in FIGS. 30 to 35) of step S2910 described above may be implemented by the device of FIGS. 30 to 35 to be described below. For example, referring to FIG. 31, one or more processors 102 may control one or more transceivers 106 and/or one or more memories 104, etc. to transmit the configuration information, and the one or more transceivers 106 may transmit the configuration information to the UE.

The base station may transmit a CSI-related reference signal (S2920). For example, the CSI-related reference signal may be a CSI-RS. The reference signal may be transmitted through a time resource, a frequency resource, or a time and frequency resource. For example, the CSI-related reference signal may include information on codevectors. The information on the codevectors may include a set of codevectors corresponding to each antenna element of an antenna array disposed in a three-dimensional shape formed based on a geodesic polyhedron.

For example, the operation of transmitting the CSI-related reference signal by the base station (100/200 in FIGS. 30 to 35) of step S2920 described above may be implemented by the device of FIGS. 30 to 35 to be described below. For example, referring to FIG. 31, one or more processors 102 may control one or more transceivers 106 and/or one or more memories 104, etc. to transmit the CSI-related reference signal, and the one or more transceivers 106 may transmit the CSI-related reference signal to the UE.

The base station may receive CSI from the UE (S2930). The CSI (or CSI report) may include PMI, CQI, and the like. For example, the CSI report may include information on both a codevector with the best performance among a plurality of codevectors and the adjacent codevector. For example, the reported CSI may include (i) an index of a first codevector corresponding to a maximum received power and (ii) an index of a second codevector and a third codevector adjacent to the first codevector. The number of reported adjacent codevectors may be configured by the base station to the UE or may be reported as many as a predefined number between the base station and the UE. As an example, a plurality of PMIs may be reported.

In addition, it is possible to include the CQI for each of the codevector with the best performance and the adjacent codevector. As an example, the reported CSI may further include a channel quality indicator (CQI) corresponding to each of the first codevector, the second codevector, and the third codevector.

For example, the CSI may be calculated based on the reference signal and the codebook.

For example, the codebook may be generated based on a path difference between a distance from an origin, which is a center of the three-dimensional shape, to the UE and a distance from a specific antenna element to the UE.

The path difference may be expressed as the following equation.

$$d_m(\Theta,\Phi) = -R(\sin\Theta \sin\theta_m \cos(\Phi-\phi_m) + \cos\Theta \cos\theta_m)$$ [Equation]

Where, m is an index of the specific antenna element, $\Theta, \Phi$ is a zenith angle and an azimuth angle of the UE, respectively, $\theta_m, \phi_m$ is the zenith angle and the azimuth angle of the specific antenna element, respectively, and R represents a distance between the origin and each antenna element.

For example, the codebook may be composed of codevectors corresponding to the number of the plurality of antenna elements. Alternatively, the codebook may be composed of the number of codevectors greater than or equal to the number of the plurality of antenna elements, and in this case, the base station may transmit information on the number of codevectors to the UE.

For example, the codevector v constituting the codebook may be expressed as the following equation.

$$v_m = v(\theta_m, \phi_m)$$ [Equation]
$$= \left[ e^{-j\frac{2\pi}{\lambda}d_0(\theta_m,\phi_m)} e^{-j\frac{2\pi}{\lambda}d_1(\theta_m,\phi_m)} \ldots e^{-j\frac{2\pi}{\lambda}d_{M-1}(\theta_m,\phi_m)} \right]^T,$$
$$m = 0, 1, \ldots, M-1$$

Where, M is the number of the plurality of antenna elements, and means a wavelength according to a carrier frequency through which the reference signal is transmitted.

For example, the codevector v constituting the codebook may be expressed by the following equation.

[Equation]
$$v_m = v(\theta_m, \phi_m)$$
$$= \left[ e^{j\frac{2\pi}{\lambda}d_0(\theta_m,\phi_m)} e^{j\frac{2\pi}{\lambda}d_1(\theta_m,\phi_m)} \ldots e^{j\frac{2\pi}{\lambda}d_{M-1}(\theta_m,\phi_m)} \right]^T,$$
$$m = 0, 1, \ldots, M-1$$

For example, the operation of receiving the CSI by the base station (100/200 in FIGS. 30 to 35) of step S2930 described above may be implemented by the device of FIGS. 30 to 35 to be described below. For example, referring to FIG. 31, one or more processors 102 may control one or more transceivers 106 and/or one or more memories 104, etc. to receive the CSI, and the one or more transceivers 106 may receive the CSI.

The base station may transmit data to the UE (S2940). In this case, detailed beamforming may be performed based on the CSI received from the UE and the data may be transmitted using a beam having optimal performance.

For example, the operation of transmitting the data by the base station (100/200 in FIGS. 30 to 35) of step S2940 described above may be implemented by the device of FIGS. 30 to 35 to be described below. For example, referring to FIG. 31, one or more processors 102 may control one or more transceivers 106 and/or one or more memories 104, etc. to transmit the data, and the one or more transceivers 106 may transmit the data.

As mentioned above, the above-described base station/UE signaling and operation (e.g., the proposed methods/FIG. 28/FIG. 29, etc.) may be implemented by the device (e.g. FIGS. 30 to 35) to be described below. For example, the base station may correspond to a first wireless device, the UE may correspond to a second wireless device, and in some cases, vice versa.

For example, referring to FIG. 35, the UE 100 may be implemented as a manned/unmanned aerial vehicle (AV) or a drone. Referring to FIG. 35, a control unit 120 may control a communication unit 110 and/or a memory unit 130 to report the channel state information to the base station 200.

For example, the above-described base station/UE signaling and operation (e.g. the proposed methods/FIG. 28/FIG. 29, etc.) may be processed by one or more processors (e.g. 102, 202) of FIGS. 30 to 35, and the above-described base station/UE signaling and operation (e.g. the proposed methods/FIGS. 28/29, etc.) may be stored in one or more memories (e.g. 104, 204) in the form of instructions/programs (e.g. instruction, executable code) for driving at least one processor (e.g. 102, 202) of FIGS. 30 to 35.

For example, in a device comprising one or more memories and one or more processors functionally connected to the one or more memories, the one or more processors may control the device to receive a CSI-related reference signal, measure CSI based on the reference signal and a codebook, and report the CSI. The reception and transmission operations of the device may be performed based on a three-dimensionally shaped antenna array formed by arranging a plurality of antenna elements in a three-dimensional configuration. The three-dimensional shape may be a three-dimensional spherical shape formed based on a geodesic polyhedron. Also, the codebook may be generated based on a path difference between a distance from an origin, which is a center of the three-dimensional shape, to the device and a distance from a specific antenna element to the device.

For another example, in one or more non-transitory computer-readable medium storing one or more instructions, the one or more instructions, which are executable by one or more processors, may include an instruction instructing a user equipment (UE) to receive a CSI-related reference signal, measure the CSI based on the reference signal and a codebook, and report the CSI. The reception and transmission operations of the UE may be performed based on a three-dimensionally shaped antenna array formed by arranging a plurality of antenna elements in a three-dimensional configuration. The three-dimensional shape may be a three-dimensional spherical shape formed based on a geodesic polyhedron. Also, the codebook may be generated based on a path difference between a distance from an origin, which is a center of the three-dimensional shape, to the UE and a distance from a specific antenna element to the UE.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 30 illustrates a communication system 1 applied to the present disclosure.

Referring to FIG. 30, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 31 illustrates wireless devices applicable to the present disclosure.

Referring to FIG. 31, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 30.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 32 illustrates a signal process circuit for a transmission signal.

Referring to FIG. 32, a signal processing circuit 1000 may include scramblers 1010, modulators 1020, a layer mapper 1030, a precoder 1040, resource mappers 1050, and signal generators 1060. An operation/function of FIG. 32 may be performed, without being limited to, the processors 102 and 202 and/or the transceivers 106 and 206 of FIG. 31. Hardware elements of FIG. 32 may be implemented by the processors 102 and 202 and/or the transceivers 106 and 206 of FIG. 31. For example, blocks 1010 to 1060 may be implemented by the processors 102 and 202 of FIG. 31. Alternatively, the blocks 1010 to 1050 may be implemented by the processors 102 and 202 of FIG. 31 and the block 1060 may be implemented by the transceivers 106 and 206 of FIG. 31.

Codewords may be converted into radio signals via the signal processing circuit 1000 of FIG. 32. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 32. For example, the wireless devices (e.g., 100 and 200 of FIG. 31) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 33 illustrates another example of a wireless device applied to the present disclosure.

The wireless device may be implemented in various forms according to a use-case/service (refer to FIG. 30). Referring to FIG. 33, wireless devices 100 and 200 may correspond to the wireless devices 100 and 200 of FIG. 31 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 31. For example, the transceiver(s) 114 may include the one or more transceivers 106 and 206 and/or the one or more antennas 108 and 208 of FIG. 31. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 30), the vehicles (100b-1 and 100b-2 of FIG. 30), the XR device (100c of FIG. 30), the hand-held device (100d of FIG. 30), the home appliance (100e of FIG. 30), the IoT device (100f of FIG. 30), a digital broadcast terminal, a hologram device, a public safety device, an MTC device, a medicine device, a fintech device (or a finance device), a security device, a climate/environment device, the AI server/device (400 of FIG. 30), the BSs (200 of FIG. 30), a network node, etc. The wireless device may be used in a mobile or fixed place according to a use-example/service.

In FIG. 33, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 34 illustrates a hand-held device applied to the present disclosure. The hand-held device may include a smartphone, a smart pad, a wearable device (e.g., a smartwatch or a smart glasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 34, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle to which the Present Disclosure is Applied FIG. 35 exemplifies a vehicle or an autonomous driving vehicle to which the present disclosure is applied.

The vehicle or autonomous driving vehicle may be implemented as a mobile robot, vehicle, train, manned/unmanned aerial vehicle (AV), ship, or the like.

Referring to FIG. 35, the vehicle or autonomous driving vehicle 100 may include an antenna unit 108, a communication unit 110, a control unit 120, a driving unit 140a, a power supply unit 140b, and a sensor unit 140c, and an autonomous driving unit 140d. The antenna unit 108 may be configured as a part of the communication unit 110. Blocks 110/130/140a-140d correspond to blocks 110/130/140 of FIG. 33, respectively.

The communication unit 110 may transmit and receive signals (e.g. data, control signals, etc.) with external devices such as other vehicles, base stations (e.g. base stations, road side units, etc.), servers, and the like. The control unit 120 may control elements of the vehicle or the autonomous driving vehicle 100 to perform various operations. The control unit 120 may include an Electronic Control Unit (ECU). The driving unit 140a may cause the vehicle or the autonomous driving vehicle 100 to run on the ground. The driving unit 140a may include an engine, a motor, a power train, a wheel, a brake, a steering device, and the like. The power supply unit 140b may supply power to the vehicle or the autonomous driving vehicle 100, and may include a wired/wireless charging circuit, a battery, and the like. The sensor unit 140c may obtain a vehicle state, surrounding environment information, user information, and the like. The sensor unit 140c may include an inertial measurement unit (IMU) sensor, a collision sensor, a wheel sensor, a speed sensor, an inclination sensor, a weight sensor, a heading sensor, a position module, and a vehicle forward/reverse sensor, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed such as adaptive cruise control, a technology for automatically driving along a predetermined route, and a technology for automatically setting a route and driving when a destination is set.

As an example, the communication unit 110 may receive map data, traffic information data, and the like from an external server. The autonomous driving unit 140d may generate an autonomous driving route and a driving plan based on the acquired data. The control unit 120 may control the driving unit 140a so that the vehicle or the autonomous driving vehicle 100 moves along the autonomous driving route according to the driving plan (e.g. speed/direction control). During the autonomous driving, the communication unit 110 may non/periodically acquire the latest traffic information data from the external server, and may acquire surrounding traffic information data from surrounding vehicles. Also, during the autonomous driving, the sensor unit 140c may acquire a vehicle state and surrounding environment information. The autonomous driving unit 140d may update the autonomous driving route and driving plan based on the newly acquired data/information. The communication unit 110 may transmit information about a vehicle location, an autonomous driving route, a driving plan, and the like to the external server. The external server may predict traffic information data in advance using AI technology or the like based on information collected from the vehicle or autonomous driving vehicles, and may provide the predicted traffic information data to the vehicle or autonomous driving vehicles.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent to constitute an embodiment by combining claims that are not explicitly cited in the claims or to be included as a new claim by amendment after filing.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

The method for transmitting and receiving channel state information in the wireless communication system of the present disclosure has been mainly described as an example applied to the 3GPP LTE/LTE-A system and the 5G system (New RAT system), but in addition to that, it is possible to apply to various wireless communication systems.

The invention claimed is:

1. A method of reporting, by user equipment (UE), channel state information (CSI) in a wireless communication system, the method comprising:
   receiving a CSI-related reference signal;
   measuring the CSI based on the reference signal and a codebook; and
   reporting the CSI,
   wherein reception and transmission operations of the UE are performed based on a three-dimensionally shaped antenna array formed by arranging a plurality of antenna elements in a three-dimensional configuration, and
   wherein the codebook is generated based on a path difference between a distance from an origin, which is a center of the three-dimensional shape, to the UE and a distance from a specific antenna element to the UE.

2. The method of claim 1, wherein the path difference is expressed as the following equation, $$d_m(\Theta,\Phi) = -R(\sin\Theta \sin\theta_m \cos(\Phi-\phi_m) + \cos\Theta \cos\theta_m) \quad \text{[Equation]}$$

where, m is an index of the specific antenna element, $\Theta, \Phi$ are a zenith angle and an azimuth angle of the UE, respectively, $\theta_m, \phi_m$ are the zenith angle and the azimuth angle of the specific antenna element, respectively, and R is a distance between the origin and each antenna element.

3. The method of claim 2, wherein the codebook is composed of codevectors corresponding to a number of the plurality of antenna elements.

4. The method of claim 3, wherein the reference signal includes information on the codevectors.

5. The method of claim 2, wherein a codevector v constituting the codebook is expressed by the following equation, $$v_m = v(\theta_m, \phi_m) \quad \text{[Equation]}$$
$$= \left[ e^{-j\frac{2\pi}{\lambda}d_0(\theta_m,\phi_m)} e^{-j\frac{2\pi}{\lambda}d_1(\theta_m,\phi_m)} \ldots e^{-j\frac{2\pi}{\lambda}d_{M-1}(\theta_m,\phi_m)} \right]^T,$$
$$m = 0, 1, \ldots, M-1$$

where M is the number of the plurality of antenna elements, and $\lambda$ is a wavelength according to a carrier frequency through which the reference signal is transmitted.

6. The method of claim 2, wherein a codevector v constituting the codebook is expressed by the following equation, $$v_m = v(\theta_m, \phi_m) \quad \text{[Equation]}$$
$$= \left[ e^{j\frac{2\pi}{\lambda}d_0(\theta_m,\phi_m)} e^{j\frac{2\pi}{\lambda}d_1(\theta_m,\phi_m)} \ldots e^{j\frac{2\pi}{\lambda}d_{M-1}(\theta_m,\phi_m)} \right]^T,$$
$$m = 0, 1, \ldots, M-1$$

where M is the number of the plurality of antenna elements, and $\lambda$ is a wavelength according to a carrier frequency through which the reference signal is transmitted.

7. The method of claim 2, wherein the codebook is composed of a number of codevectors greater than or equal to the number of the plurality of antenna elements, and further includes receiving information on the number of the codevectors.

8. The method of claim 7, wherein the reported CSI further includes a channel quality indicator (CQI) corresponding to each of the first codevector, the second codevector, and the third codevector.

9. The method of claim 1, wherein the measuring the CSI includes measuring received power based on the reference signal, and
the reported CSI includes (i) an index of a first codevector corresponding to a maximum received power and (ii) an index of a second codevector and a third codevector adjacent to the first codevector.

10. The method of claim 1, wherein the three-dimensional shape is a three-dimensional spherical shape formed based on a geodesic polyhedron.

11. The method of claim 10, wherein each antenna element of the plurality of antenna elements is disposed at a position corresponding to a dividing point generated by equally dividing an angle between one side of a regular polyhedron constituting the geodesic polyhedron and a center of the regular polyhedron.

12. The method of claim 10, further comprising:
receiving information on a number of divisions to constitute the geodesic polyhedron.

13. The method of claim 1, wherein a distance between a first antenna element and a second antenna element is a wavelength/2 according to a carrier frequency through which the reference signal is transmitted.

14. A user equipment (UE) configured to report channel state information (CSI) in a wireless communication system, the UE comprising:
at least one transceiver;
at least one processor; and
at least one memory operably connectable to the at least one processor and storing instructions that, based on being executed by the at least one processor, perform operations comprising:
receiving a CSI-related reference signal;
measuring the CSI based on the reference signal and a codebook; and
reporting the CSI,
wherein the operations are performed based on a three-dimensionally shaped antenna array formed by arranging a plurality of antenna elements in a three-dimensional configuration, and
wherein the codebook is generated based on a path difference between a distance from an origin, which is a center of the three-dimensional shape, to the UE and a distance from a specific antenna element to the UE.

15. The UE of claim 14, wherein the path difference is expressed as the following equation, $$d_m(\Theta,\Phi) = -R(\sin\Theta \sin\theta_m \cos(\Phi-\phi_m) + \cos\Theta \cos\theta_m) \quad \text{[Equation]}$$

where, m is an index of the specific antenna element, $\Theta,\Phi$ are a zenith angle and an azimuth angle of the UE, respectively, $\theta_m,\phi_m$ are the zenith angle and the azimuth angle of the specific antenna element, respectively, and R is a distance between the origin and each antenna element.

16. A method of receiving, by a base station (BS) channel state information (CSI) in a wireless communication system, the method comprising:
transmitting, to a user equipment (UE), a CSI-related reference signal; and
receiving the CSI from the UE,
wherein reception and transmission operations of the BS are performed based on a three-dimensionally shaped antenna array formed by arranging a plurality of antenna elements in a three-dimensional configuration,
wherein the CSI is measured based on the reference signal and a codebook, and
wherein the codebook is generated based on a path difference between a distance from an origin, which is a center of the three-dimensional shape, to the UE and a distance from a specific antenna element to the UE.

17. The method of claim 16, wherein the path difference is expressed as the following equation, $$d_m(\Theta,\Phi) = -R(\sin\Theta \sin\theta_m \cos(\Phi-\phi_m) + \cos\Theta \cos\theta_m) \quad \text{[Equation]}$$

where, m is an index of the specific antenna element, $\Theta,\Phi$ are a zenith angle and an azimuth angle of the UE, respectively, $\theta_m,\phi_m$ are the zenith angle and the azimuth angle of the specific antenna element, respectively, and R is a distance between the origin and each antenna element.

18. The method of claim 16, wherein the three-dimensional shape is a three-dimensional spherical shape formed based on a geodesic polyhedron.

19. The method of claim 16, wherein the CSI includes (i) an index of a first codevector corresponding to a maximum received power and (ii) an index of a second codevector and a third codevector adjacent to the first codevector.

* * * * *